(12) United States Patent
Nishizaki et al.

(10) Patent No.: US 11,077,753 B2
(45) Date of Patent: Aug. 3, 2021

(54) INFORMATION PROVISION DEVICE, INFORMATION PROVISION METHOD, AND RECORDING MEDIUM STORING INFORMATION PROVISION PROGRAM FOR A VEHICLE DISPLAY

(71) Applicants: Yoshiaki Nishizaki, Kanagawa (JP); Michinari Shinohara, Kanagawa (JP)

(72) Inventors: Yoshiaki Nishizaki, Kanagawa (JP); Michinari Shinohara, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/027,876

(22) Filed: Jul. 5, 2018

(65) Prior Publication Data

US 2018/0319281 A1    Nov. 8, 2018

Related U.S. Application Data

(63) Continuation of application No. 14/961,004, filed on Dec. 7, 2015, now Pat. No. 10,040,351.

(30) Foreign Application Priority Data

Dec. 10, 2014   (JP) .................................. 2014-249961
Dec. 10, 2014   (JP) .................................. 2014-250090

(51) Int. Cl.
*B60K 35/00*     (2006.01)
*G02B 27/01*     (2006.01)
(Continued)

(52) U.S. Cl.
CPC ............ *B60K 35/00* (2013.01); *G02B 26/105* (2013.01); *G02B 27/01* (2013.01);
(Continued)

(58) Field of Classification Search
CPC ... G02B 27/01–0149; G02B 2027/0105–0198; B60K 35/00;
(Continued)

(56) References Cited

U.S. PATENT DOCUMENTS 4,892,386 A    1/1990  Suzuki
5,519,536 A    5/1996  Hoehn
(Continued)

FOREIGN PATENT DOCUMENTS

DE    101010063339    6/2012
GB         2472773 A   2/2011
(Continued)

OTHER PUBLICATIONS

Office Action dated Aug. 3, 2018 in Japanese Patent Application No. 2014-249961, 2 pages.
(Continued)

*Primary Examiner* — Gene W Lee
(74) *Attorney, Agent, or Firm* — Oblon, McClelland, Maier & Neustadt, L.L.P.

(57) ABSTRACT

An information provision device, information provision method, and a non-transitory recording medium storing a program for causing a computer to execute the information provision method. Each of the information provision device and the information provision method includes projecting an image light to a light transmission member to display a for-driver information image indicating for-driver information to be provided to a driver of a mobile object in a prescribed display area, and displaying at a first point where a normal for-driver information image is displayed a priority for-driver information image in place of the normal for-driver information image, where the displaying includes displaying the normal for-driver information image at a second point different from the first point for at least some
(Continued)

of a period during which the priority for-driver information image is displayed at the first point.

9 Claims, 9 Drawing Sheets

(51) Int. Cl.
*G09G 3/02* (2006.01)
*G09G 5/377* (2006.01)
*G02B 26/10* (2006.01)
*G09G 3/00* (2006.01)
*G01C 21/36* (2006.01)
*G09G 3/34* (2006.01)

(52) U.S. Cl.
CPC ......... *G02B 27/0101* (2013.01); *G09G 3/002* (2013.01); *G09G 3/025* (2013.01); *G09G 5/377* (2013.01); *B60K 2370/152* (2019.05); *B60K 2370/155* (2019.05); *B60K 2370/1529* (2019.05); *B60K 2370/16* (2019.05); *B60K 2370/166* (2019.05); *B60K 2370/167* (2019.05); *B60K 2370/168* (2019.05); *B60K 2370/177* (2019.05); *B60K 2370/178* (2019.05); *B60K 2370/179* (2019.05); *B60K 2370/18* (2019.05); *B60K 2370/186* (2019.05); *B60K 2370/191* (2019.05); *B60K 2370/193* (2019.05); *B60K 2370/195* (2019.05); *B60K 2370/333* (2019.05); *B60K 2370/334* (2019.05); *B60K 2370/349* (2019.05); *G01C 21/365* (2013.01); *G02B 2027/014* (2013.01); *G02B 2027/0141* (2013.01); *G09G 3/3413* (2013.01); *G09G 2320/0626* (2013.01); *G09G 2340/125* (2013.01); *G09G 2360/16* (2013.01); *G09G 2380/10* (2013.01)

(58) Field of Classification Search
CPC ........ B60K 2370/178; B60K 2370/179; G01C 21/365; G09G 3/002; G09G 2380/10
See application file for complete search history.

(56) References Cited

U.S. PATENT DOCUMENTS

| | | | |
|---|---|---|---|
| 6,750,832 B1 | 6/2004 | Kleinschmidt | |
| 7,342,514 B1 | 3/2008 | Bailey | |
| 7,382,288 B1 | 6/2008 | Wilson | |
| 7,561,966 B2 | 7/2009 | Nakamura et al. | |
| 7,564,372 B1 | 7/2009 | Bailey | |
| 7,940,285 B2 | 5/2011 | Would | |
| 8,081,089 B2 | 12/2011 | Fein | |
| 8,411,235 B1* | 4/2013 | Barnidge et al. | G02F 1/1335 |
| 8,704,653 B2 | 4/2014 | Seder | |
| 2002/0183924 A1* | 12/2002 | Yokota | G01C 21/36 |
| | | | 701/410 |
| 2003/0154022 A1* | 8/2003 | Tanabe | G01C 21/3626 |
| | | | 701/533 |
| 2005/0154505 A1 | 7/2005 | Nakamura et al. | |
| 2006/0290482 A1 | 12/2006 | Matsumoto | |
| 2007/0194902 A1* | 8/2007 | Blanco | G01C 21/365 |
| | | | 340/461 |
| 2007/0225902 A1* | 9/2007 | Gretton | G01C 21/26 |
| | | | 701/533 |
| 2009/0160736 A1* | 6/2009 | Shikita | G02B 27/0101 |
| | | | 345/7 |
| 2009/0201589 A1 | 8/2009 | Freeman | |
| 2010/0073636 A1 | 3/2010 | Sasaki et al. | |
| 2010/0157430 A1 | 6/2010 | Hotta et al. | |
| 2010/0253540 A1* | 10/2010 | Seder | B60R 1/00 |
| | | | 340/905 |
| 2010/0321170 A1 | 12/2010 | Cooper | |
| 2011/0090074 A1 | 4/2011 | Kuno et al. | |
| 2011/0163864 A1 | 7/2011 | Watanabe et al. | |
| 2013/0063754 A1 | 3/2013 | Saisho et al. | |
| 2013/0147945 A1 | 6/2013 | Watanabe | |
| 2014/0211319 A1 | 7/2014 | Park | |
| 2015/0291033 A1 | 10/2015 | Restauri, III | |
| 2016/0070102 A1* | 3/2016 | Takamatsu et al. | G02B 27/01 |

FOREIGN PATENT DOCUMENTS

| | | |
|---|---|---|
| JP | 3-67730 A | 3/1991 |
| JP | 7-266925 A | 10/1995 |
| JP | 7-270711 A | 10/1995 |
| JP | 8-184457 A | 7/1996 |
| JP | 11-339192 A | 12/1999 |
| JP | 2005-127749 A | 5/2005 |
| JP | 2006-258783 A | 9/2006 |
| JP | 2007-121031 A | 5/2007 |
| JP | 2010-72455 A | 4/2010 |
| JP | 2010-096874 | 4/2010 |
| JP | 2011-79345 A | 4/2011 |
| JP | 2011-093454 A | 5/2011 |
| JP | 2013-041182 | 2/2013 |
| JP | 2013-061554 | 4/2013 |
| JP | 2014-151770 A | 8/2014 |
| JP | 2015-140061 A | 8/2015 |
| JP | 2016-68693 A | 5/2016 |
| WO | WO 2014/095067 A1 | 6/2014 |
| WO | WO 2014/095071 A1 | 6/2014 |
| WO | WO2014/174575 A1 | 10/2014 |

OTHER PUBLICATIONS

Extended European Search Report dated May 10, 2016 in Patent Application No. 15197070.4.
European Search Report dated Feb. 2, 2018 for European Patent Application No. 17201704.8-1012.
Japanese Office Action, Decision for Denial of Amendments, Issued in Japanese Patent Application No. 2014-250090 dated Jun. 21, 2019, with dispatch No. 253597 (5 pages).
Japanese Office Action, Reason for Rejections, Issued in Japanese Patent Application No. 2014-250090 dated Jun. 21, 2019 with dispatch No. 253598 (1 page).
Office Action dated Jan. 24, 2020, in corresponding Japanese Patent Application No. 2019-065708.
The Extended Euroean Search Report dated Jul. 10, 2020, in corresponding European Patent Application No. 20164923.3, 6 pages.

* cited by examiner

INFORMATION PROVISION DEVICE, INFORMATION PROVISION METHOD, AND RECORDING MEDIUM STORING INFORMATION PROVISION PROGRAM FOR A VEHICLE DISPLAY

CROSS-REFERENCE TO RELATED APPLICATIONS

This patent application is a continuation of U.S. patent application Ser. No. 14/961,004, filed Dec. 7, 2015, which is filed based on and claims priority pursuant to 35 U.S.C. § 119(a) to Japanese Patent Application Nos. 2014-249961 and 2014-250090, filed on Dec. 10, 2014, and Dec. 10, 2014, respectively, in the Japan Patent Office, the entire disclosure of which is hereby incorporated by reference herein.

BACKGROUND

Technical Field

Embodiments of the present invention relate to an information provision device, an information provision method, and a recording medium storing an information provision program.

Background Art

An information provision device for which a heads-up display (HUD) or the like is provided is known in the art, and such a HUD projects an image to provide information to the driver of a mobile object such as a vehicle, ship, aircraft, and a steel-collar worker (robot).

SUMMARY

Embodiments of the present invention described herein provide an information provision device, information provision method, and a non-transitory recording medium storing a program for causing a computer to execute the information provision method. Each of the information provision device and the information provision method includes projecting an image light to a light transmission member to display a for-driver information image indicating for-driver information to be provided to a driver of a mobile object in a prescribed display area that is visually recognized by the driver through the light transmission member ahead of the mobile object in a direction of travel, thereby providing the for-driver information to the driver, and displaying, according to a prescribed priority for-driver information display condition, at a first point where a normal for-driver information image is displayed a priority for-driver information image indicating priority for-driver information that has higher priority in provision to the driver than normal for-driver information according to the normal for-driver information image in place of the normal for-driver information image, where the displaying includes displaying the normal for-driver information image at a second point different from the first point for at least some of a period during which the priority for-driver information image is displayed at the first point.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

Figure 1:
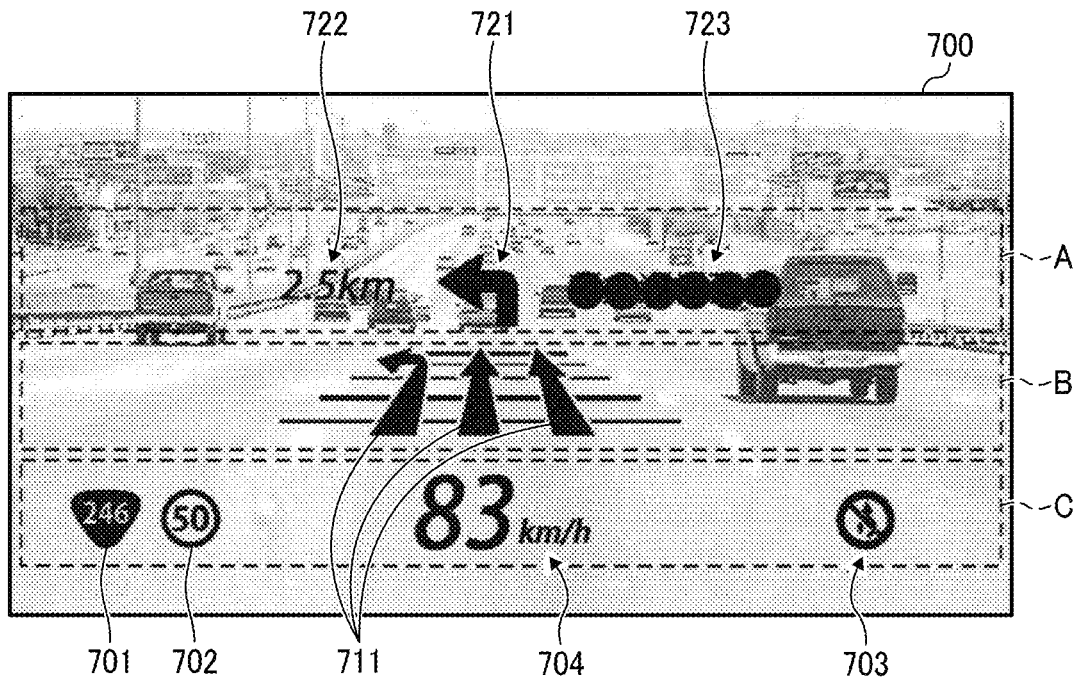
FIG. 1 is a schematic diagram of an example virtual image displayed in a display area over the sight ahead of the vehicle viewed by a driver through the front windshield, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware at existing network elements or control nodes. Such existing hardware may include one or more central processing units (CPUs), digital signal processors (DSPs), application-specific-integrated-circuits (ASICs), field programmable gate arrays (FPGAs), computers or the like. These terms in general may be collectively referred to as processors.

Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Figure 2:
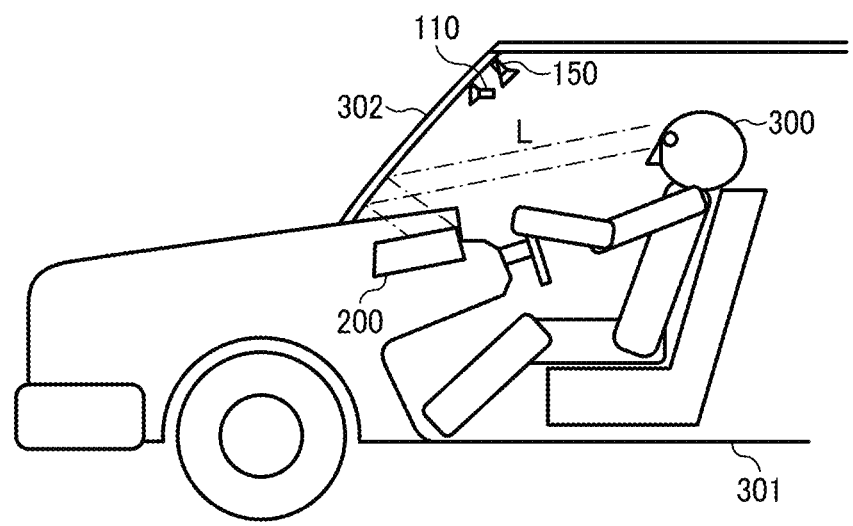
FIG. 2 is a schematic diagram of the configuration of a car for which an on-vehicle HUD according to an embodiment of the present invention is provided.
Figure 3:
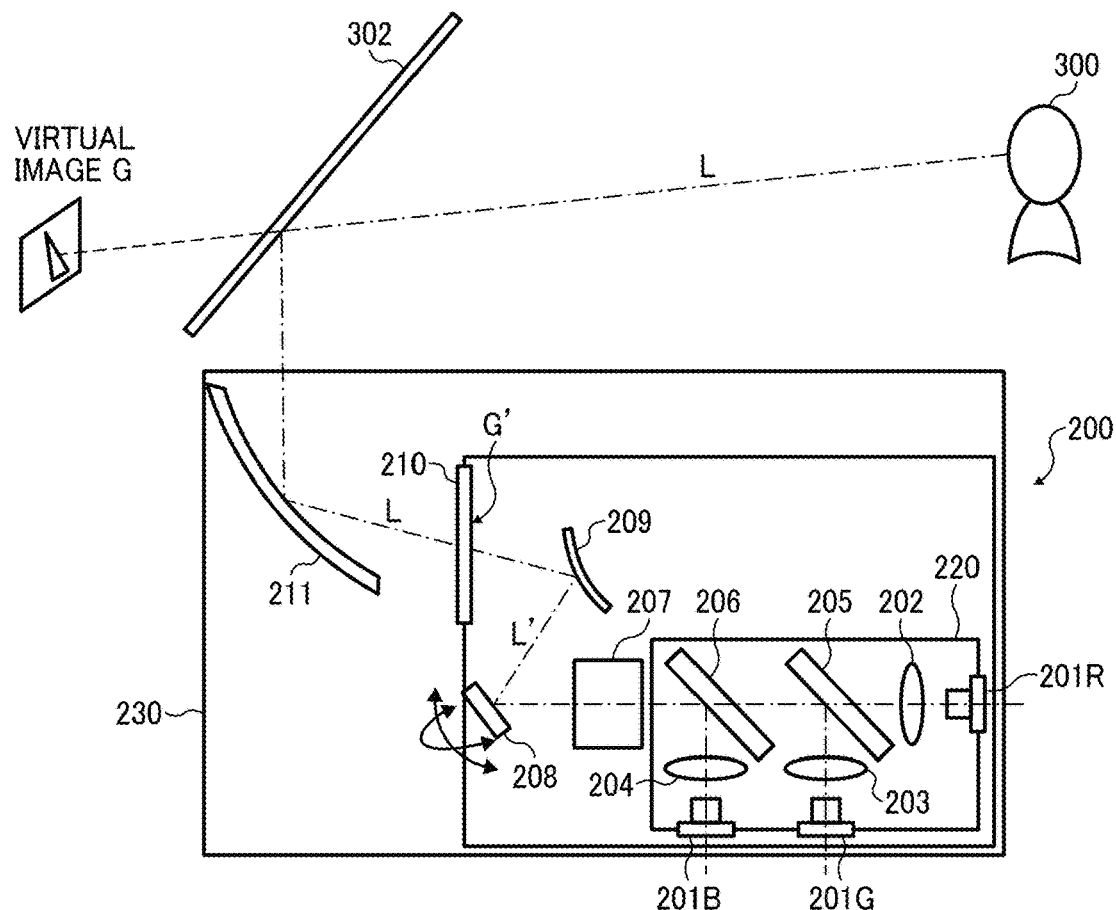
FIG. 3 is a schematic diagram of the internal structure of an on-vehicle HUD according to an example embodiment of the present invention.

An information provision system for a driver, which serves as an information provision device, to which an on-vehicle heads-up display (HUD) according to an embodiment of the present invention is applied, is described. FIG. 1 is a schematic diagram of an example virtual image G displayed in a display area 700 over the sight ahead of the vehicle 301 viewed by a driver 300 through a front windshield 302, according to the present embodiment. FIG. 2 is a schematic diagram of a car for which the on-vehicle HUD according to the present example embodiment is provided. FIG. 3 is a schematic diagram of the internal structure of the on-vehicle HUD according to the present example embodiment.

An on-vehicle HUD 200 according to the present embodiment is installed, for example, in the dashboard of the car 301 that serves as a mobile object. The projection light L, which is the light for projecting an image, that is emitted from the on-vehicle HUD 200 disposed in the dashboard is reflected at a front windshield 302 that serves as a light transmission member, and is headed for a driver 300. Accordingly, the driver 300 can visually recognize a HUD display image such as a navigation image, which will be described later, as a virtual image. Note that a combiner that serves as a light transmission member may be disposed on the inner wall of the front windshield 302, and the driver 300 may visually recognizes a virtual image formed by the projection light L that is reflected by the combiner.

In the present embodiment, the optical system or the like of the on-vehicle HUD 200 is configured such that the distance from the driver 300 to a virtual image G becomes equal to or longer than 5 meters (m). In the known on-vehicle HUDs, the distance from the driver 300 to the virtual image G is about 2 m. Usually, the driver 300 observes a point at infinity ahead of the vehicle, or observes a preceding vehicle a few tens of meters ahead of the vehicle. When the driver 300 who is focusing on an object in the distance attempts to visually recognize the virtual image G that is two meters ahead of the vehicle, the crystalline lenses of the eyes need to be moved widely because the focal length greatly varies. In such cases, the time required to adjust the focus of the eyes and focus on the virtual image G becomes longer, and it takes a long time to recognize the detail of the virtual image G. What is worse, the eyes of the driver 300 tend to get tired. Moreover, it is difficult for the driver to realize the detail of the virtual image G, and it is difficult to use the virtual image G to appropriately provide information to the driver.

If the distance to the virtual image G is equal to or longer than 5 m as in the present embodiment, the amount of movement in the crystalline lenses of the eyes is reduced to a less amount of movement than the background art, and the time required to adjust the focus of the eyes and focus on the virtual image G becomes shorter. Accordingly, the driver 300 can recognize the detail of the virtual image G at an early stage, and the possible tiredness of the eyes of the driver 300 can be reduced. Moreover, it becomes easier for the driver to realize the detail of the virtual image G, and it is easy to use the virtual image G to appropriately provide information to the driver.

The on-vehicle HUD 200 includes a HUD 230, and the HUD 230 includes red, green, and blue laser beam sources 201R, 201G, and 201B, collimator lenses 202, 203, and 204 that are provided for the laser beam sources 201R, 201G, and 201B, respectively, two dichroic mirrors 205 and 206, a light quantity adjuster 207, an optical scanner 208, a free-form surface mirror 209, a microlens array 210 that serves as a light dispersing member, and a projector mirror 211 that serves as a light reflecting member. A light source unit 220 according to the present embodiment includes the laser beam sources 201R, 201G, and 201B, the collimator lenses 202, 203, and 204, and the dichroic mirrors 205 and 206, and these elements are unitized by an optical housing.

Each of the laser beam sources 201R, 201G, and 201B may be an LD (semiconductor laser element). The wavelength of the laser-beam bundle that is emitted from the red laser beam source 201R is, for example, 640 nanometer (nm). The wavelength of the laser-beam bundle that is emitted from the green laser beam source 201G is, for example, 530 nm. The wavelength of the laser-beam bundle that is emitted from the blue laser beam source 201B is, for example, 445 nm.

The on-vehicle HUD 200 according to the present embodiment projects the intermediate image formed on the microlens array 210 onto the front windshield 302 of the vehicle 301, such that the driver 300 can visually recognize the magnified intermediate image as a virtual image G. The laser beams of the RGB colors emitted from the laser beam sources 201R, 201G, and 201B are approximately collimated by the collimator lenses 202, 203, and 204, and are combined by the two dichroic mirrors 205 and 206. The light quantity of the combined laser beam is adjusted by the light quantity adjuster 207, and then the adjusted laser beam is two-dimensionally scanned by the mirror of the optical scanner 208. The scanned light L' that is two-dimensionally scanned by the optical scanner 208 is reflected by the free-form surface mirror 209 so as to correct the distortion, and then is collected and condensed to the microlens array 210. Accordingly, an intermediate image is drawn.

In the present embodiment, the microlens array 210 is used as a light dispersing member that individually disperses and emits the laser-beam bundle of each pixel of the intermediate image (i.e., each point of the intermediate image). However, any other light dispersing member may be used. Alternatively, a liquid crystal display (LCD) or a vacuum fluorescent display (VFD) may be used as a method of forming the intermediate image G'.

However, in order to display the virtual image G with a wide dimension and high brightness, the laser scanning system is desired as in the present embodiment. In the systems where an LCD or VFD is used, a non-image area of the display area on which the virtual image G is displayed is slightly irradiated with light, and it is difficult to completely shut such light to the non-image area. For this reason, in the systems where an LCD or VFD is used, the non-image area disturbs the visual recognizability of the sight ahead of the vehicle 301. By contrast, if a laser scanning system is adopted as in the present embodiment, the light that irradiates the non-image area of the display area on which the virtual image G is displayed can be completely shut by switching off the laser beam sources 201R, 201G, and 201B. For this reason, if a laser scanning system is adopted as in the present embodiment, the non-image area does not disturb the visual recognizability of the sight ahead of the vehicle 301 as the light from the on-vehicle HUD 200 that may irradiate the non-image area can be completely shut.

When the degree of warning is to be enhanced by gradually increasing the brightness of the warning image that alerts the driver, the display needs to be controlled such that only the brightness of the warning image gradually increases among the various kinds of images displayed in the display area 700. Again, the laser scanning system is suitable for such cases where the display is controlled such that the brightness of a part of the images displayed in the display area 700 is selectively increased. In the systems with the LCD or the VFD, the brightness of the images other than the warning image also increases among the various kinds of images displayed in the display area 700. In such cases, the difference in brightness cannot be increased between the warning image and the other images. Accordingly, the degree of the warning cannot be sufficiently enhanced by gradually increasing the brightness of the warning image.

The optical scanner 208 uses a known actuator driver system such as a micro-electromechanical systems (MEMS) to incline the mirror to the main-scanning direction and the sub-scanning direction, and two-dimensionally scans (raster-scans) the laser beams that enter the mirror. The mirror is controlled in synchronization with the timing at which the laser beam sources 201R, 201G, and 201B emit light. The configuration of the optical scanner 208 is not limited to the present embodiment described above, but the optical scanner 208 may be configured, for example, by a mirror system that includes two mirrors that pivot or rotate around the two axes that are orthogonal to each other.

Figure 4:
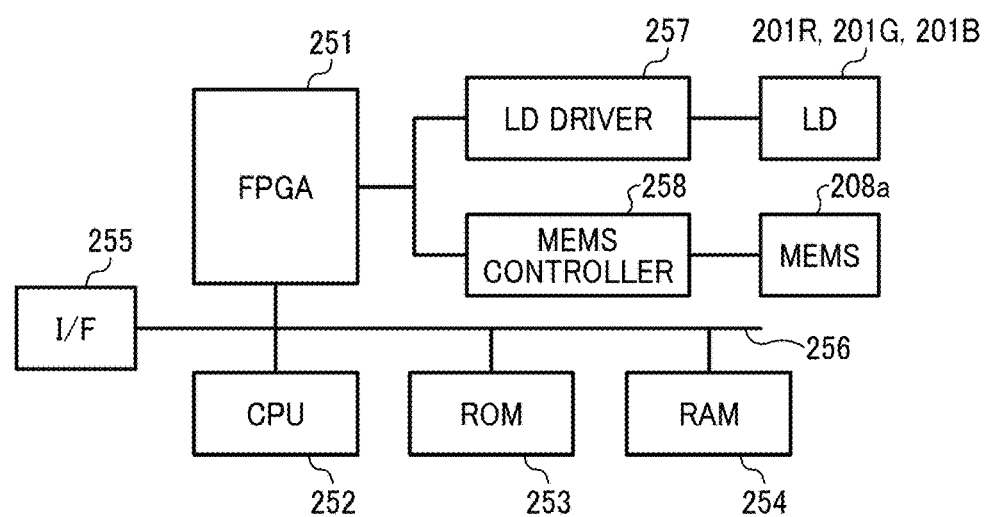
FIG. 4 is a block diagram illustrating the hardware configuration of a control system of an on-vehicle HUD according to an example of the present invention.

FIG. 4 is a block diagram illustrating the hardware configuration of a control system of the on-vehicle HUD 200 according to the present embodiment. The control system of the on-vehicle HUD 200 includes a field programmable gate array (FPGA) 251, a CPU 252, a read only memory (ROM) 253, a random access memory (RAM) 254, an interface (I/F) 255, a bus line 256, a laser diode (LD) driver 257, and a MEMS controller 258. The FPGA 251 uses the LD driver 257 to control the operation of the laser beam sources 201R, 201G, and 201B of the light source unit 220. Moreover, the FPGA 251 uses the MEMS controller 258 to controlling the operation of a MEMS 208a of the optical scanner 208. The CPU 252 controls the operation of the on-vehicle HUD 200. The ROM 253 stores various kinds of programs such as an image processing program that is executed by the CPU 252 to control the operation of the on-vehicle HUD 200. The RAM 254 is mainly used as a working area in which the CPU 252 executes a program. The I/F 255 allows the on-vehicle HUD 200 to communicate with an external controller such as a controller area network (CAN) of the vehicle 301. For example, the on-vehicle HUD 200 is connected to an object recognition device 100, a vehicle navigation device 400, and various kinds of sensor device 500 through the CAN of the vehicle 301. The object recognition device 100, the vehicle navigation device 400, and the sensor device 500 will be described later in detail.

Figure 5:
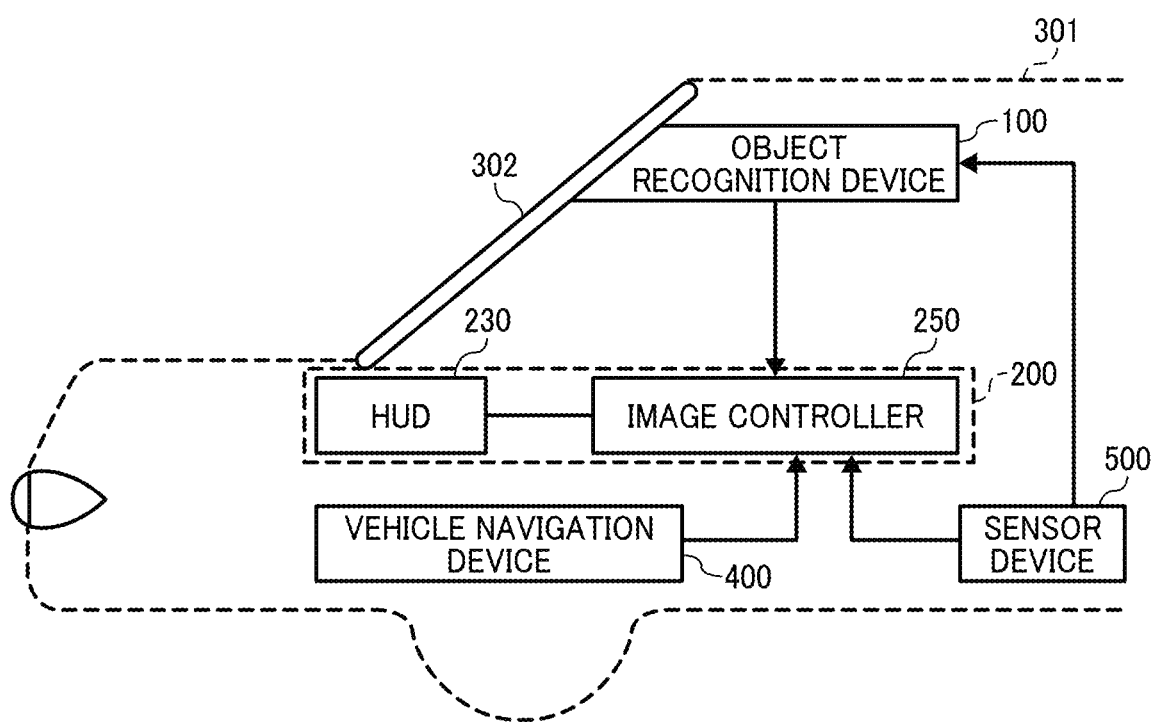
FIG. 5 is a block diagram illustrating an outline of the configuration of an information provision system for a driver, according to an embodiment of the present invention.

FIG. 5 is a block diagram illustrating an outline of the configuration of an information provision system for a driver according to the present embodiment. In the present embodiment, as an information acquisition unit that obtains for-driver information to be provided to a driver via a virtual image G, for example, the object recognition device 100, the vehicle navigation device 400, and the sensor device 500 are provided. The on-vehicle HUD 200 according to the present embodiment includes the HUD 230 that serves as an image-light projection device, and the image controller 250 that serves as a display controller. The information acquisition unit according to the present embodiment is provided for the vehicle 301, but the vehicle 301 may use an external information acquisition unit to obtain the information input from the external information acquisition unit through a means of communication.

Figure 6:
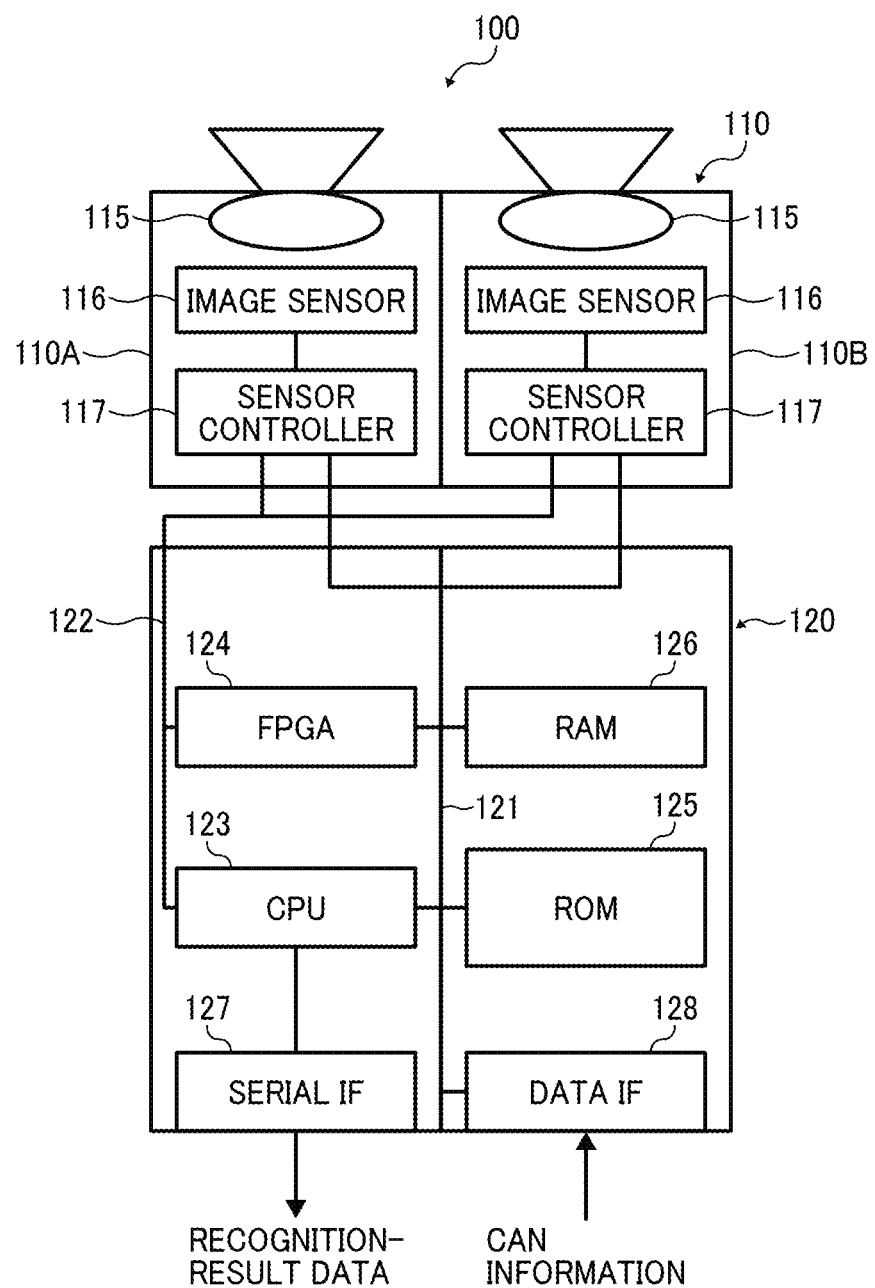
FIG. 6 is a schematic block diagram illustrating the hardware configuration of an object recognition device in an information provision system for a driver, according to an embodiment of the present invention.

FIG. 6 is a schematic block diagram illustrating the hardware configuration of the object recognition device 100 according to the present embodiment. The object recognition device 100 according to the present embodiment includes a stereo camera 110 that captures an area ahead of the vehicle 301 as a captured area, and an information processing unit 120 that performs image processing to recognize a prescribed object existing in the captured area according to the image data captured by the stereo camera 110. Note that the stereo camera 110 may be replaced with a combination of a monocular camera that serves as an imaging unit, and a laser radar (millimeter-wave radar) that serves as a distance measuring equipment. The stereo camera 110 includes a first camera unit 110A for a left eye and a second camera unit 110B for a right eye, and these two camera units are combined together in parallel. Each of the camera unit 110A and the camera unit 110B includes a lens 115, an image sensor 116, and a sensor controller 117. The image sensor 116 may be composed of, for example, a charge-coupled device (CCD) or a complementary metal oxide semiconductor (CMOS). The sensor controller 117 controls, for example, the exposure of the image sensor 116, the reading of an image, the communication with an external circuit, and the sending of the image data. The stereo camera 110 is disposed near the rear-view mirror provided for the front windshield 302 of the vehicle 301.

The information processing unit 120 includes a data bus line 121, a serial bus line 122, central processing unit (CPU) 123, a field programmable gate array (FPGA) 124, a ROM 125, a RAM 126, a serial interface (I/F) 127, and a data interface (I/F) 128.

The stereo camera 110 is connected to the information processing unit 120 through the data bus line 121 and the serial bus line 122. The CPU 123 controls, for example, the sensor controllers 117 of the stereo camera 110, the entire operation of the information processing unit 120, and the execution of image processing. The brightness image data of the images that are captured by the image sensors 116 of the camera unit 110A and the camera unit 110B are written into the RAM 126 of the information processing unit 120 through the data bus line 121. The control data for changing the exposure value of a sensor from the CPU 123 or the FPGA 124, the control data for changing the image reading parameter, various kinds of setting data, or the like are transmitted and received through the serial bus line 122.

The FPGA 124 performs processing that needs to be done in real time on the image data stored in the RAM 126, such as gamma correction, distortion correction (collimation of an image on the right and left), parallax computation using block matching, to generate a parallax image, and writes the generated parallax image into the RAM 18 again. In the ROM 125, a recognition program is stored for recognizing a prescribed object including a three-dimensional object such as a vehicle or pedestrian, a boundary line for lanes such as a white line on the road, and a curbstone or median strip arranged by the roadside. The recognition program is an example of an image processing program.

The CPU 123 obtains CAN information such as vehicle speed, acceleration, a rudder angle, and a yaw rate from the sensor device 500 through the data I/F 128. The data I/F 128 may be, for example, a CAN of the vehicle 301. Then, the CPU 123 performs image processing using the brightness image and parallax image stored in the RAM 126, according to the recognition program stored in the ROM 125, and recognizes an object such as a preceding vehicle 350 or a traffic lane line.

The recognition-result data of an object is supplied, for example, to the image controller 250 and an external device such as a vehicle drive control unit, through the serial I/F 127. The vehicle drive control unit uses the recognition-result data of an object to perform brake control, speed control, steering control, or the like of the vehicle 301, and implements, for example, cruise control in which the vehicle 301 automatically tracks a preceding vehicle so as to maintain a prescribed following distance, and an automatic brake control in which the collision with an obstacle ahead of the vehicle is avoided or attenuated.

The vehicle navigation device 400 according to the present embodiment may be any known vehicle navigation device provided for a vehicle or the like. The vehicle navigation device 400 outputs information used for generating a route navigation image to be displayed on a virtual image G, and the information output from the vehicle navigation device 400 is input to the image controller 250. The information that is output from the vehicle navigation device 400 includes, for example, as illustrated in FIG. 1, images indicating the number of the lanes (traffic lanes) of the road on which the vehicle 301 is traveling, the distance to the next point where the direction is to be changed (for example, a right turn, left turn, and a branch point), and the direction to which the path is to be changed next in order. As such information is input from the vehicle navigation device 400 to the image controller 250, under the control of the image controller 250, the on-vehicle HUD 200 displays navigation images such as a lane indicator image 711, a path indicator image 721, a remaining distance indicator image 722, an intersection or the like name indicator image 723, on an upper display area A or middle display area B of the display area 700.

In the example image illustrated in FIG. 1, images indicating road-specific information (e.g., road name, and speed limit) is displayed on a lower display area C of the display area 700. The road-specific information is also input from the vehicle navigation device 400 to the image controller 250. The image controller 250 uses the on-vehicle HUD 200 to display the road-specific information such as a road-name display image 701, a speed limit display image 702, and a no-passing zone display image 703 on the lower display area C of the display area 700.

The sensor 500 according to the present embodiment includes one or two or more sensors that detect various kinds of information such as the behavior of the vehicle 301, the state of the vehicle 301, and the environment around the vehicle 301. The sensor device 500 outputs sensing information used for generating an image to be displayed as a virtual image G, and the information output from the sensor 500 is input to the image controller 250. In the example image illustrated in FIG. 1, a vehicle speed display image 704 indicating the vehicle speed of the vehicle 301 (i.e., the textual image of "83 km/h" in FIG. 1) is displayed on the lower display area C of the display area 700. The vehicle-speed information included in the CAN information of the vehicle 301 is input from the sensor device 500 to the image controller 250, and the image controller 250 controls the on-vehicle HUD 200 to display the textual image indicating the vehicle speed on the lower display area C of the display area 700.

In addition to the sensor that detects the vehicle speed of the vehicle 301, the sensor device 500 includes, for example, a laser radar or imaging device that detects the distance from another vehicle, a pedestrian, or construction such as a guard rail and a utility pole, which exist around (ahead of, on the side of, in the rear of) the vehicle 301, a sensor that detects the external environmental information (e.g., outside air temperature, brightness, and weather) of the vehicle 301, a sensor that detects the driving action (e.g., braking action, and the degree of acceleration) of the driver 300, a sensor that senses the amount of the fuel remaining in the fuel tank of the vehicle 301, and a sensor that senses the state of various kinds of vehicle-borne equipment such as an engine and a battery. As such information is detected by the sensor 500 device and sent to the image controller 250, the on-vehicle HUD 200 can display the information as a virtual image G. Accordingly, the information can be provided to the driver 300.

Figure 7:
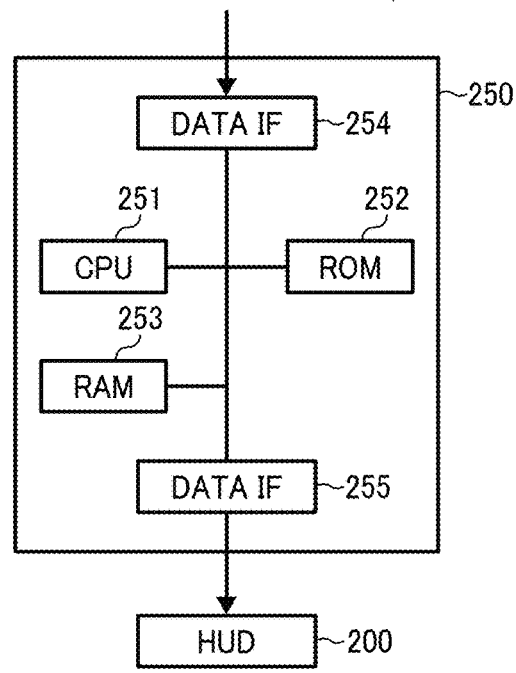
FIG. 7 is a schematic block diagram illustrating the hardware configuration of an image controller in an on-vehicle HUD according to an embodiment of the present invention.

FIG. 7 is a schematic block diagram illustrating the hardware configuration of the image controller 250. In the image controller 250, a CPU 251, a RAM 252, a ROM 253, an input data interface (I/F) 254, and output data interface (I/F) 255 are connected to each other via a data bus line. To the input data I/F 254, for example, various kinds of recognition-result data output from the object recognition device 100, the sensing information output from the sensor device 500, and various kinds of information output from the vehicle navigation device 400 are input. From the output data I/F 255, for example, a control signal for the on-vehicle HUD 200 is output. The CPU 251 executes various kinds of computer program such as an information-provision control program, which is stored, for example, in the ROM 253, to control the image controller 250 to perform various kinds of control and process as will be described later.

Next, a virtual image G that is displayed by the on-vehicle HUD 200 according to the present embodiment is described.

In the present embodiment, for-driver information that the on-vehicle HUD 200 provides for a driver via a virtual image G may be any information. In the present embodiment, the for-driver information is broadly divided into passive information and active information. The passive information includes the information that is to be provided to the driver at the timing when the on-vehicle HUD 200 is configured. For example, the passive information includes the information whose provision timing has a certain relation with the detail of the information. The active information is to be provided to the driver only when he or she wishes. For example, the active information includes information where the timing of its provision has low or no relevance to the detail of the information.

The passive information includes, for example, security information for driving, and route navigation information. The security information for driving includes, for example, the following-distance information indicating the distance between the vehicle 301 and the preceding vehicle 350 (i.e., a following-distance presenting image 712 as will be described later), and information including urgent matters for driving (e.g., warning information such as an instruction for urgent action to be taken by a driver, or attention attracting information). The route navigation information indicates a route to a prescribed destination, and such a route is provided to a driver by any known vehicle navigation device. The route navigation information includes, for example, lane information (i.e., the lane indicator image 711) indicating a lane to be taken at an upcoming intersection, and direction-change instruction information indicating a direction change to be made at the next intersection or branch point where the direction is to be changed from the straight-ahead direction. The direction-change instruction information includes, for example, path indicating information (i.e., the path indicator image 721) that indicates the path to be taken at the next intersection or branch point, remaining distance information (i.e., the remaining distance indicator image 722) indicating the distance to the intersection or branch point where the direction change is to be made, and name information of the intersection or branch point (i.e., the intersection or the like name indicator image 723).

As the active information is obtained by the driver at the timing when he or she wishes, the active information is usually displayed for a long time or displayed continuously. For example, the road-specific information of the road on which the vehicle 301 is traveling, the vehicle-speed information (i.e., the vehicle speed display image 704) of the vehicle 301, the current-time information are included in the active information. The road-specific information includes, for example, the road-name information (i.e., the road-name display image 701), the regulation information of the road such as speed limit (i.e., the speed limit display image 702 and the no-passing zone display image 703), and other kinds of information of the road useful for the driver.

In the present embodiment, the for-driver information, which is broadly divided into the active information and the passive information as described above, is displayed in a corresponding area of the display area 700 where a virtual image is displayable. More specifically, in the present embodiment, the display area 700 is divided into three display areas in the up-and-down directions. Then, a passive-information image that corresponds to the passive information is displayed in the upper display area A and the middle display area B of the obtained three display areas, and an active-information image that corresponds to the active information is displayed in the lower display area C.

Note that some of the active-information image may be displayed upper display area A and the middle display area B. In such cases, the active-information image is displayed in such a manner that a higher priority is given to the viewability of the passive-information image displayed in the upper display area A and the middle display area B.

The passive information according to the present embodiment includes instruction information indicating an instruction given to the driver 300, like the route navigation information or the like. When such instruction information is provided to a driver, it is usually desired that not only an instruction image indicating an upcoming instruction but also an instruction image indicating a future instruction be displayed together. By so doing, the feelings of anxiety that a driver may have (e.g., the driver may be anxious about what action he/she has to make in the near future) can be reduced. In the example illustrated in FIG. 1, together with the lane indicator image 711 indicating a lane to be taken at an upcoming intersection, direction-change instruction images including the path indicator image 721, the remaining distance indicator image 722, and the intersection or the like name indicator image 723 are displayed, indicating a direction change to be made at the next intersection or branch point where the direction is to be changed from the straight-ahead direction. In the following description, the path indicator image 721, the remaining distance indicator image 722, and the intersection or the like name indicator image 723 may be referred to simply as direction-change instruction images 721, 722, and 723, for the sake of explanatory convenience.

As described above, when a plurality of instruction images with varying operational sequences, i.e., the lane indicator image 711 and the direction-change instruction images 721, 722, and 723, are displayed in the display area 700 at the same time, it is desired that the situation be avoided in which the driver confuses among the operational sequences of the instruction indicated by the instruction images.

In view of the above circumstances, in the present embodiment, the display of a plurality of instruction images with varying operational sequences is controlled such that an instruction image with a lower priority for the driver in the operational sequence is displayed on an upper side of the display area 700. In other words, the direction-change instruction images 721, 722, and 723 with a lower priority in the operational sequence than the lane indicator image 711 is displayed on an upper side of the display area 700 than the lane indicator image 711. Accordingly, the situation can be avoided in which the driver confuses among the operational sequences of the instruction indicated by lane indicator image 711 and the direction-change instruction images 721, 722, and 723. Such avoidance is achieved for the reasons given below.

While the driver 300 is driving the vehicle 301, normally, he or she has a sense of distance that an object existing ahead of the moving vehicle 301 gets close to the current position as the time passes by. Moreover, the driver 300 has a sense of time that a future event gets close to the current time as the time passes by. An object existing ahead of the moving vehicle 301 reaches the vehicle 301 in a shorter time as the distance between the object and the vehicle 301 is shorter, and it takes a longer time for the object existing ahead of the moving vehicle 301 to reach the position of the vehicle 301 as the distance between the object and the vehicle 301 is longer. For these reasons, an object that is ahead of the vehicle 301 and is far away from the moving vehicle 301 has a high affinity of perception for a far future event, and an object that is ahead of the vehicle 301 and is close to the moving vehicle 301 has a high affinity of perception for a close future event.

In view of such an affinity, an indicator image of far future (i.e., an instruction image with a lower priority in the operational sequence such as the direction-change instruction images 721, 722, and 723) is displayed so as to overlap with a position where an object that is far away from the moving vehicle 301 ahead of the vehicle 301 is visually recognized, and an indicator image of near future or now (i.e., an instruction image with a high priority in the operational sequence such as the lane indicator image 711) is displayed so as to overlap with a position where an object that is close to the moving vehicle 301 ahead of the vehicle 301 is visually recognized. By so doing, the sequence of operation of the instruction can be recognized by the driver through intuition. As described above, while the driver 300 is driving the vehicle, he or she usually observes a point at infinity ahead of the vehicle 301, or observes the rear of preceding vehicle 350 a few tens of meters ahead of the vehicle 301. In such cases, the observation point is approximately near the center in the vertical direction of the sight viewed through the front windshield 302. In the present embodiment, the display area 700 in which the lane indicator image 711 and the direction-change instruction images 721, 722, and 723 with different operational sequences are displayed is positioned at a lower part of the sight viewed through the front windshield 302. Accordingly, in the present embodiment, the lane indicator image 711 and the direction-change instruction images 721, 722, and 723 are displayed under the observation point of the driver so as to overlap with the sight viewed through the front windshield 302. In the sight under the observation point of the driver 300 ahead of the vehicle 301, an object that is far away from the vehicle 301 is visually recognized on an upper side of the sight, and an object that is close to the vehicle 301 is visually recognized on a lower side of the sight.

Accordingly, in the present embodiment, the direction-change instruction images 721, 722, and 723 with a lower priority in the operational sequence than the lane indicator image 711 is displayed on an upper side of the display area 700 than the lane indicator image 711. More specifically, the direction-change instruction images 721, 722, and 723 with a lower priority in the operational sequence are displayed in the upper display area A of the display area 700 that overlaps with a point where an object that is far away from the moving vehicle 301 ahead of the vehicle 301 is visually recognized, and the lane indicator image 711 with a higher priority in the operational sequence is displayed in the middle display area B of the display area 700 that overlaps with a point where an object that is close to the moving vehicle 301 ahead of the vehicle 301 is visually recognized. By so doing, due to the high affinity of recognition as described above, the sequence of operation of the instruction can be recognized by the driver through intuition, and the situation can be avoided in which the driver confuses among the operational sequences of the instruction indicated by the instruction images.

On the contrary, if the affinity of recognition is not considered and the position at which the lane indicator image 711 is displayed and the position at which the direction-change instruction images 721, 722, and 723 are displayed are, for example, inverted up-and-down direction with reference to the present embodiment or rearranged horizontally, it becomes difficult for the driver to recognize the operational sequence through intuition as the driver is disturbed by the sense of distance or the sense of time as described above.

In view of the affinity of recognition as described above, in the present embodiment, instruction images that indicate the instructions with the same operational sequence are horizontally arranged. More specifically, the three direction-change instruction images 721, 722, and 723 that are displayed in the upper display area A are horizontally arranged in the upper display area A to indicate the direction-change instruction information indicating a direction change to be made at the next intersection or branch point where the direction is to be changed from the straight-ahead direction. According to the sense of distance or the sense of time as described above, the three direction-change instruction images 721, 722, and 723 that are horizontally arranged at the same position in the up-and-down directions can easily be recognized through intuition that these images indicate the instruction to be dealt with around the same time. Accordingly, the driver 300 can appropriately recognize the information of the direction-change instruction images 721, 722, and 723.

In the present embodiment, a stereoscopic image is used as the virtual image G that is displayed in the display area 700. More specifically, perspective images are used as the lane indicator image 711 and the following-distance presenting image 712 that are displayed in the middle display area B of the display area 700.

More specifically, a perspective image that is drawn by the perspective drawing method such that the length of the five horizontal lines of the following-distance presenting image 712 becomes shorter towards the upper side and the following-distance presenting image 712 heads for a single vanishing point. In particular, in the present embodiment, the following-distance presenting image 712 is displayed such that the vanishing point approximately matches the observation point of the driver. Due to this configuration, while the driver 300 is driving, he or she can easily perceive the depth of the following-distance presenting image 712. Moreover, in the present embodiment, a perspective image in which the thickness of the horizontal lines becomes thinner towards the upper side and the brightness of the horizontal lines becomes lower towards the upper side is used. Due to this configuration, while the driver 300 is driving, he or she can even more easily perceive the depth of the following-distance presenting image 712.

The depth perception is created for the virtual image G that is displayed in the display area 700 by making use of such a stereoscopic image as described above. Accordingly, the driver can easily perceive the relevance between the distance to the object in the sight ahead of the vehicle and the position of the image displayed in display area 700 in the up-and-down directions. As a result, the above-described affinity of recognition is more easily achieved, and the driver can easily recognize through intuition that the instruction of the lane indicator image 711 displayed in the middle display area B of the display area 700 is to be dealt with prior to the instruction of the direction-change instruction images 721, 722, and 723 displayed in the upper display area A of the display area 700.

Note that lane indicator image 711 is also drawn by the perspective drawing method in a similar manner to the following-distance presenting image 712, such that the lane indicator image 711 heads for the same vanishing point as that of the following-distance presenting image 712. However, the lane indicator image 711 is to provide the instruction to the driver. For this reason, if a lower priority is given to the creation of the depth perception to the lane indicator image 711 and a higher priority is given to the accurate provision of the instruction indicated by the lane indicator image 711 to the driver, for example, the brightness of the images of the three arrows that make up the lane indicator image 711 may be increased towards the leading ends of the arrows. While it is easier to create the depth perception when the brightness becomes lower towards the upper side, the brightness of the lane indicator image 711 becomes higher towards the upper side in the above cases. Although it is not possible to create the depth perception in the above cases, the visual recognizability of the arrows increases by increasing the brightness of the leading ends of the arrows. Accordingly, the instruction that is indicated by the lane indicator image 711 can more accurately provided to the driver. It is to be noted that the depth perception does not significantly deteriorate in the above cases as the lane indicator image 711 is drawn using the perspective drawing method.

In the present embodiment, a motion-parallax image that is achieved by making use of a motion parallax is used as the virtual image G in order to create further depth perception. The motion parallax indicates the parallax that is caused as the position of the eyes of the driver 300 (i.e., the viewpoint) moves. The driver 300 perceives the distance to the object (depth dimension), which is influenced by a motion parallax due to the displacement in movement where an object closer to the driver in the sight ahead of the vehicle appears to move in a greater amount and an object more distant from the driver in the sight ahead of the vehicle appears to move in a smaller amount when the position of the eyes of the driver 300 moves.

In the present embodiment, as illustrated in FIG. 2, a driver camera 150 that monitors the positions of the eyes of the driver 300 (i.e., the location of the viewpoint) is disposed near the rear-view mirror provided for the front windshield 302 of the vehicle 301. In order to monitor the motion of the driver 300 in the up-and-down and right-and-left directions accurately, it is desired that the driver camera 150 be disposed around the median line drawn from the driver 300 who sits in the driver's seat. Moreover, it is desired that the driver camera 150 be disposed, for example, on an upper side so as not to obstruct the view of the driver 300.

The driver camera 150 is a monocular camera that is configured to capture an area where the driver 300 who sits in the driver's seat and is driving the vehicle is expected to move his/her head. In a similar manner to the camera unit 110A and the camera unit 110B provided for the stereo camera 110, the driver camera 150 includes, for example, a lens, an image sensor, and a sensor controller. A stereo camera may be used as the driver camera 150 in order to keep track of the position of the eyes of the driver in the forward and backward directions.

The brightness image data of the images captured by the driver camera 150 is input to image controller 250. The image controller 250 uses the CPU 251 to execute an information-provision control program stored in the ROM 253 or the like, and recognizes the position of the eyes of the driver 300 based on the brightness image data obtained from the driver camera 150. In the present embodiment, the position of the head of the driver 300 is recognized in a simplified manner based on the brightness image data obtained from the driver camera 150, and the position of the eyes of the driver 300 is estimated based on the results of the recognition. Note that any desired known recognition method may be adopted as a method of recognizing the position of the head of the driver 300.

Figure 8:
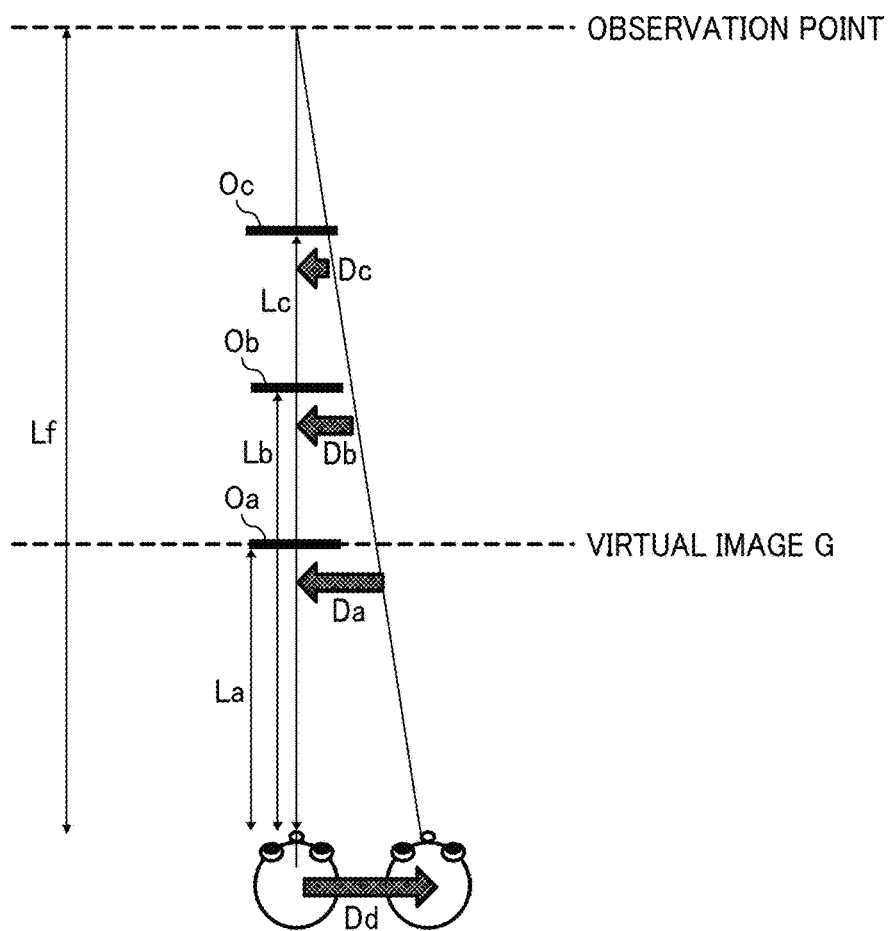
FIG. 8 is a schematic diagram illustrating a method of processing a virtual image with a depth perception that is created by a motion parallax, according to an embodiment of the present invention.

FIG. 8 is a schematic diagram illustrating a method of processing a virtual image G with a depth perception that is created by a motion parallax, according to the present embodiment. When the head of the driver 300 moves by the amount "Dd" as illustrated in FIG. 8, the position at which an object Oa with a short distance La from the driver 300 is visually recognized moves by the amount "Da", and the position at which an object Ob with a long distance Lb from the driver 300 is visually recognized moves by the amount "Db" that is smaller than "Da". Moreover, the position at which an object Oc with an even longer distance Lc from the driver 300 is visually recognized moves by the amount "Dc" that is even smaller than "Db". Due to the difference in the amounts of movement "Da", "Db", and "Dc" of the positions at which the objects Oa, Ob, and Oc are visually recognized, the driver 300 can perceive that the object Oa, the object Ob, and the object Oc exist with the distance La, distance Lb, and distance Lc, respectively, away from the driver 300.

In the present embodiment, the virtual image G is displayed with the distance of 5 m away from the driver 300, and any of the images on the virtual image G is displayed with the distance of 5 m away from the driver 300. In the present embodiment, a plurality of images on the virtual image G are modified using the motion parallax as described above such that the images are perceived by the driver 300 as if the images are displayed with varying distances.

More specifically, the image controller 250 recognizes the position of the head of the driver 300 at prescribed time intervals based on the brightness image data of the images captured by the driver camera 150. Then, the image controller 250 calculates the driver's head movement amount Dd that indicates the amount where the head of driver 300 has moved during the prescribed time intervals. In this case, the position at which the virtual image G is visually recognized with the distance of 5 m moves by the amount "Da".

In the present embodiment, the positions of the images that are displayed in the lower display area C are fixed in the display area 700. Accordingly, the position at which the images displayed in the lower display area C are visually recognized moves by the amount "Da", which is the same as the amount in which the virtual image G moves. As a result, the driver 300 perceives the images displayed in the lower display area C with the distance La (5 m).

By contrast, the image controller 250 shifts the images displayed in the middle display area B of the display area 700 of the virtual image G to the reverse direction to the direction in which the head of the driver has moved in the display area 700 by the amount "Da-Db", based on the calculated driver's head movement amount Dd. Accordingly, the position at which the images displayed in the middle display area B are visually recognized by the driver 300 moves by the amount "Db". As a result, the driver 300 perceives the images displayed in the middle display area B with the distance Lb.

In a similar manner to the above, the image controller 250 shifts the images displayed in the upper display area A of the display area 700 of the virtual image G to the reverse direction to the direction in which the head of the driver has moved in the display area 700 by the amount "Da-Dc", based on the calculated driver's head movement amount Dd. Accordingly, the position at which the images displayed in the upper display area A are visually recognized by the driver 300 moves by the amount "Dc". As a result, the driver 300 perceives the images displayed in the upper display area A with the distance Lc.

As described above, the virtual image G is projected while controlling, based on the calculated driver's head movement amount Dd, the amount "Db" and "Dc" by which the positions at which the images displayed in the upper display area A and the middle display area B are visually recognized move. Accordingly, the driver 300 perceives the images as if the images displayed in the middle display area B (including, for example, the lane indicator image 711 and the following-distance presenting image 712) are displayed at a position further than the images displayed in the lower display area C (including, for example, the road-name display image 701, the speed limit display image 702, and the no-passing zone display image 703). Moreover, the driver 300 perceives the images as if the images displayed in the upper display area A (including, for example, the direction-change instruction images 721, 722, and 723) are displayed at a position even further than the images displayed in the middle display area B. As described above, the images on the virtual image G that are actually displayed with the same distance can be modified such that the driver 300 perceives these images with varying distances. By so doing, the depth perception of the virtual image G can be created.

In particular, in the present embodiment, the images that are displayed in the middle display area B are divided into a plurality of sections up-and-down directions, and the amount of the movement is varied for each of the sections based on the driver's head movement amount Dd. By so doing, the driver 300 perceives the images displayed in the middle display area B as if an image on the upper side is displayed with a longer distance. As described above, not only the representation using the perspective drawing but also the motion parallax are used for the lane indicator image 711 and the following-distance presenting image 712 that are displayed in the middle display area B. As a result, the depth dimension of the virtual image G can further be created.

Figure 9:
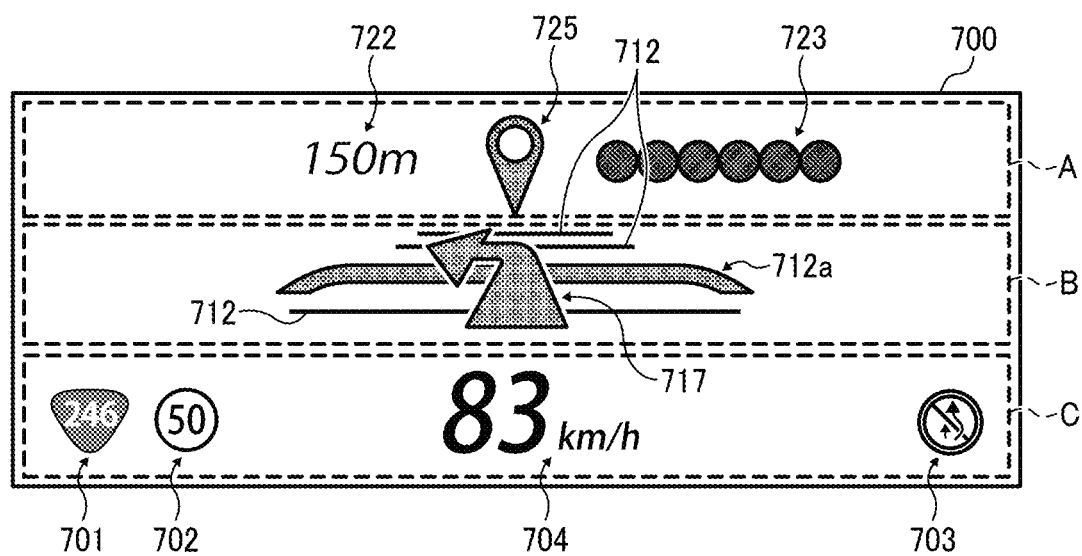
FIG. 9 is a schematic diagram illustrating an example image of the situation in which the direction is to be changed at an upcoming intersection, according to an embodiment of the present invention.

FIG. 9 is a schematic diagram illustrating an example image of the situation in which the direction is to be changed at an upcoming intersection, according to the present embodiment. When it comes to a situation in which the direction is to be changed at an upcoming intersection, the example image illustrated in FIG. 1 is switched to the example image as illustrated in FIG. 9. In other words, in place of the lane indicator image 711 displayed in the middle display area B, a path indicator image 717 that is similar to the path indicator image 721 displayed in the upper display area A of the example image illustrated in FIG. 1 is displayed in the middle display area B. Accordingly, the driver 300 can know that he/she only has to follow the path indicator image 717 displayed in the middle display area B at the next intersection or branch point.

In the example image illustrated in FIG. 9, a downward-pointing sign 725 is displayed at the position of the path indicator image 721 displayed in the upper display area A of the example image illustrated in FIG. 1. The downward-pointing sign 725 guides the line of sight of the driver 300 to the path indicator image 717 displayed in the middle display area B. Accordingly, the driver 300 can easily recognize the path indicator image 717 displayed in the middle display area B.

Next, the control of the display of a preceding vehicle image 724 and the following-distance presenting image 712 that together provide the driver with a preceding-vehicle approaching information indicating that the following distance between the vehicle 350 and the preceding vehicle is becoming narrow is described. In the present embodiment, the object recognition device 100 or the sensor device 500 recognizes the following distance to the preceding vehicle 350. Then, the image controller 250 receives the recognition-result data that indicates the distance to an object ahead of the vehicle, and controls, based on the recognition-result data, the brightness, color, shape, or the like of the preceding vehicle image 724 displayed in the upper display area A or the following-distance presenting image 712 displayed in the middle display area B. In the present embodiment, the driver 300 is notified of how much the following distance to the preceding vehicle 350 is becoming narrow by the changes made to the following-distance presenting image 712 and the preceding vehicle image 724.

[First Example Image]

Figure 10A:
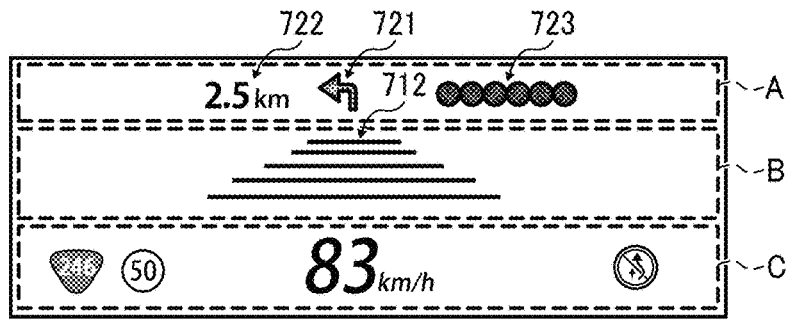
FIGS. 10A to 10E are schematic diagrams of first example images where the images indicating the preceding-vehicle approaching information change according to the following distance to the preceding vehicle, according to an embodiment of the present invention.

FIGS. 10A to 10E are schematic diagrams of example images where images indicating the preceding-vehicle approaching information change according to the following distance to the preceding vehicle 350, according to the present embodiment. Note that these example images illustrated in FIGS. 10A to 10E are referred to as first example images. When the preceding vehicle 350 is not recognized in the first example images, as illustrated in FIG. 10A, the image controller 250 displays in the middle display area B the following-distance presenting image 712 that consist of five horizontal lines where the length becomes shorter and the brightness becomes lower towards the upper side. In the upper display area A, the direction-change instruction images 721, 722, and 723 are displayed according to the route navigation information output from the vehicle navigation device 400.

Figure 10B:
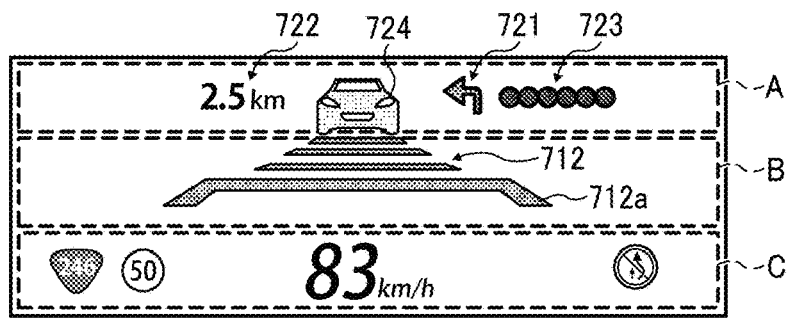

When the preceding vehicle 350 is recognized and the following distance to the preceding vehicle 350 is longer than a prescribed safe range, as illustrated in FIG. 10B, the image controller 250 increases the brightness of the following-distance presenting image 712 that is displayed in the middle display area B. Further, in the first example image, the image of the lowest horizontal line of the following-distance presenting image 712 is replaced with a vehicle bumper image 712a that is a line where the thickness is greater and the both ends of the line is extended downward and outward. The vehicle bumper image 712a recalls the front bumper of the vehicle 301 to the driver 300.

Further, as illustrated in FIG. 10B, the preceding vehicle image 724 with low brightness that resembles the rear view of a preceding vehicle is displayed at the point within the upper display area A where the path indicator image 721 is displayed in the situation of FIG. 10A. The preceding-vehicle approaching information that is provided to the driver 300 via this preceding vehicle image 724 is the priority for-driver information that has higher priority in provision to the driver than the route navigation information that is given to the driver via the direction-change instruction images 721, 722, and 723. Such priority for-driver information is to be recognized by the driver 300 in a prompt and accurate manner. For this reason, it is desired that the preceding vehicle image 724 be displayed on a priority basis at a point near the observation point that the driver is observing while he or she is driving. More specifically, it is desired that the preceding vehicle image 724 be displayed on a priority basis at a point near the center of the upper display area A in the right and left directions. Note that such a point near the center of the upper display area A in the right and left directions will be referred to as a priority for-driver information display point in the following description.

However, when the preceding vehicle image 724 is not displayed on a priority basis, as illustrated in FIG. 10A, the path indicator image 721 is displayed at that priority for-driver information display point (near the center of the upper display area A in the right and left directions). For this reason, when the preceding vehicle image 724 is displayed at the priority for-driver information display point on a priority basis, the path indicator image 721 cannot be displayed at the priority for-driver information display point.

In order for the preceding vehicle image 724 to be recognized by the driver 300 in a prompt and accurate manner, it may be preferable to reduce the images other than the preceding vehicle image 724 as much as possible. From this point of view, the direction-change instruction images 721, 722, and 723 may be all hidden in the upper display area A. However, if the direction-change instruction images 721, 722, and 723 are hidden while the preceding vehicle image 724 is displayed on a priority basis, the driver 300 cannot be provided with the route navigation information via the direction-change instruction images 721, 722, and 723. Accordingly, the driver cannot know the distance left before the next point of direction change (e.g., right turn, left turn, and turning point), and the direction to which the path is to be changed next in order. Due to this configuration, the driver 300 may be confused as a result, or the safe driving of the driver 300 may be affected on the contrary. Alternatively, while the preceding vehicle image 724 is displayed on a priority basis, the path indicator image 721 or all the direction-change instruction images 721, 722, and 723 that are displayed at the priority for-driver information display point (near the center of the upper display area A in the right and left directions) may be moved to a different position far away from the priority for-driver information display point. For example, while the preceding vehicle image 724 is displayed on a priority basis, the path indicator image 721 or all the direction-change instruction images 721, 722, and 723 that are displayed at the priority for-driver information display point (near the center of the upper display area A in the right and left directions) may be moved to a display area other than the upper display area A such as the lower display area C and the middle display area B of the display area 700. In such configuration, even while the preceding vehicle image 724 is displayed on a priority basis, the driver 300 can be provided with the route navigation information via the direction-change instruction images 721, 722, and 723. However, if the display position of the direction-change instruction images 721, 722, and 723 is switched among the upper display area A, the middle display area B, and the lower display area C depending on whether or not the preceding vehicle image 724 is displayed on a priority basis, the driver who wants to obtain the route navigation information via the direction-change instruction images 721, 722, and 723 cannot find the direction-change instruction images 721, 722, and 723 immediately. In such a configuration, again, the driver may be confused as a result.

In particular, in the present embodiment, the display area 700 in which the virtual image G displayable is divided into three display areas in the up-and-down directions. Moreover, the types of information to be displayed on the respective display areas are sorted according to a prescribed rule. Accordingly, the driver 300 tends to believe that the direction-change instruction images 721, 722, and 723 that are normally displayed in the upper display area A are kind of information that is to be displayed in the upper display area A. For these reasons, the driver who wants to obtain the route navigation information via the direction-change instruction images 721, 722, and 723 will search the upper display area A on a priority basis to find the route navigation information. Accordingly, if the display position of the direction-change instruction images 721, 722, and 723 is switched to a different display area depending on whether or not the preceding vehicle image 724 is displayed on a priority basis, the driver will have difficulty in finding the direction-change instruction images 721, 722, and 723.

In order to avoid such situation, in the present embodiment, while the preceding vehicle image 724 is displayed on a priority basis at the priority for-driver information display point (near the center of the upper display area A in the right and left directions), the path indicator image 721 that is displayed at the priority for-driver information display point is displayed near the preceding vehicle image 724. More specifically, as illustrated in FIG. 10B, the path indicator image 721 is displayed at a point adjacent to the preceding vehicle image 724 on the right side of the same upper display area A. Accordingly, even while the preceding vehicle image 724 is displayed on a priority basis, the driver 300 can be provided with the route navigation information of the path indicator image 721. What is more, the path indicator image 721 is displayed in the same upper display area A regardless of whether the preceding vehicle image 724 is being displayed on a priority basis or hidden. Accordingly, the positions at which the path indicator image 721 is displayed are close to each other between when the preceding vehicle image 724 is being displayed on a priority basis and when the preceding vehicle image 724 is hidden, and the driver who wants to obtain the route navigation information of the path indicator image 721 can find the path indicator image 721 immediately. In such a configuration, the driver does not get confused.

In the present embodiment, the point at which the path indicator image 721 is displayed while the preceding vehicle image 724 is being displayed on a priority basis is the point at which the intersection or the like name indicator image 723 is displayed while the preceding vehicle image 724 is hidden. As a result, while the preceding vehicle image 724 is being displayed on a priority basis, the intersection or the like name indicator image 723 cannot be displayed at the same point because the path indicator image 721 is displayed at that point. At that time, the intersection or the like name indicator image 723 may be hidden. However, in the present embodiment, the intersection or the like name indicator image 723 is displayed at a different point in the same upper display area A. More specifically, as illustrated in FIG. 10B, the intersection or the like name indicator image 723 is displayed at a point adjacent to the path indicator image 721 on the right side of the same upper display area A. Accordingly, even while the preceding vehicle image 724 is displayed on a priority basis, the driver can also be provided with the route navigation information of the intersection or the like name indicator image 723.

Figure 10C:
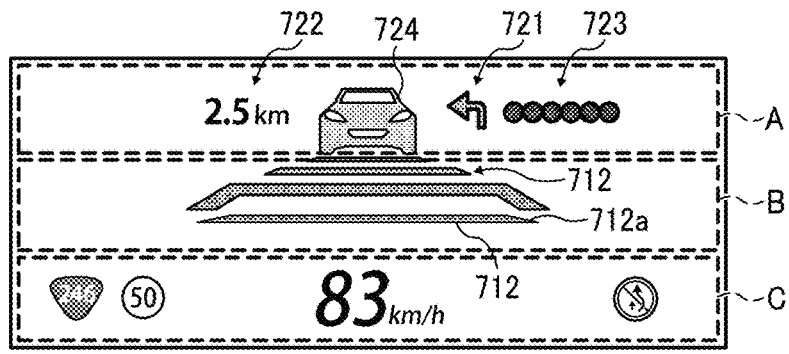

When the preceding vehicle 350 is recognized and the following distance to the preceding vehicle 350 is within the prescribed safe range, as illustrated in FIG. 10C, the image controller 250 increases the brightness of the following-distance presenting image 712 displayed in the middle display area B and the brightness of the preceding vehicle image 724 displayed in the upper display area A to a degree greater than that of the example image illustrated in FIG. 10B. Further, in the first example image, the image of the second horizontal line from the bottom of the following-distance presenting image 712 is changed to the vehicle bumper image 712*a*. By so doing, compared with the image illustrated in FIG. 10B, the vehicle bumper image 712*a* appears closer to the preceding vehicle 724. Accordingly, compared with the image illustrated in FIG. 10B, the driver 300 can know that the vehicle 301 is getting closer to the preceding vehicle 350.

Figure 10D:
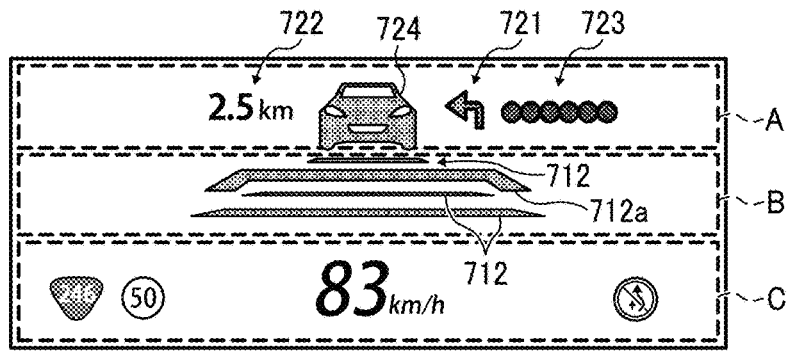

When the preceding vehicle 350 is recognized and the following distance to the preceding vehicle 350 is shorter than the prescribed safe range but longer than a prescribed braking-required distance, as illustrated in FIG. 10D, the image controller 250 increases the brightness of the following-distance presenting image 712 displayed in the middle display area B and the brightness of the preceding vehicle image 724 displayed in the upper display area A to a degree greater than that of the example image illustrated in FIG. 10C. Further, in the first example image, the image of the third horizontal line from the bottom of the following-distance presenting image 712 is changed to the vehicle bumper image 712a. By so doing, compared with the image illustrated in FIG. 10C, the vehicle bumper image 712a appears even closer to the preceding vehicle 724. Accordingly, compared with the image illustrated in FIG. 10C, the driver 300 can know that the vehicle 301 is getting even closer to the preceding vehicle 350.

Figure 10E:
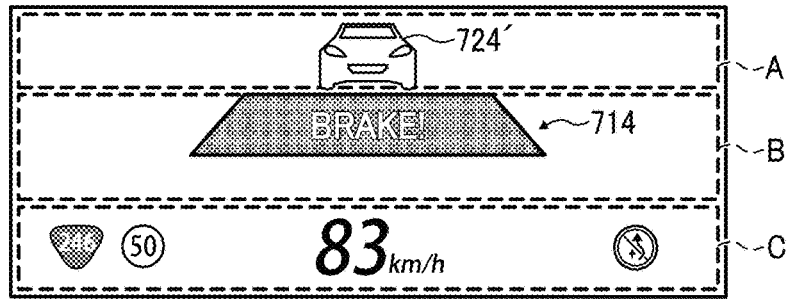

When the preceding vehicle 350 is recognized and the following distance to the preceding vehicle 350 becomes shorter and is within the range of the prescribed braking-required distance, as illustrated in FIG. 10E, the image controller 250 changes the following-distance presenting image 712 that is displayed in the middle display area B to a brake warning image 714 where the textual image "BRAKE!" in a red trapezoid-shaped box. In so doing, the visual recognizability of the preceding vehicle image 724 may be reduced by decreasing the brightness of the preceding vehicle image 724 displayed in the upper display area A or by removing the solid fill of the preceding vehicle image 724 displayed in the upper display area A. Accordingly, the brake warning image 714 stands out, which is desirable.

In particular, in the present embodiment, as illustrated in FIG. 10E, all the direction-change instruction images 721, 722, and 723 are hidden in the upper display area A such that the brake warning image 716 stands out and the visual recognizability is enhanced. As described above, the direction-change instruction images 721, 722, and 723, which are not hidden when the preceding vehicle image 724 is displayed on a priority basis as illustrated in FIG. 10B, FIG. 10C, and FIG. 10D to provide the preceding-vehicle approaching information, are all hidden when the preceding-vehicle approaching information with greater urgency, as illustrated in FIG. 10E, is to be provided via the brake warning image 714. Accordingly, the brake warning image 714 stands out even more, and the preceding-vehicle approaching information with greater urgency can be recognized by the driver in a prompt and accurate manner.

It is to be noted that the prescribed safe range or the prescribed braking-required distance described as above may be fixed in advance, or may vary according to the vehicle speed or the like of the vehicle 301.

[Second Example Image]

Figure 11A:
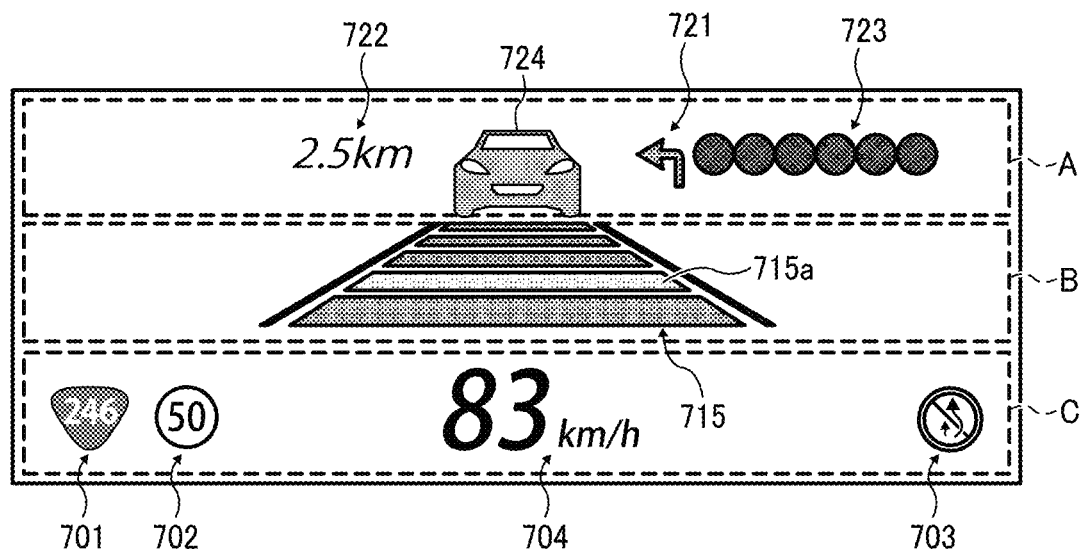
FIG. 11A and FIG. 11B are schematic diagrams of second example images where the images indicating the preceding-vehicle approaching information change according to the following distance to the preceding vehicle, according to an embodiment of the present invention.
Figure 11B:
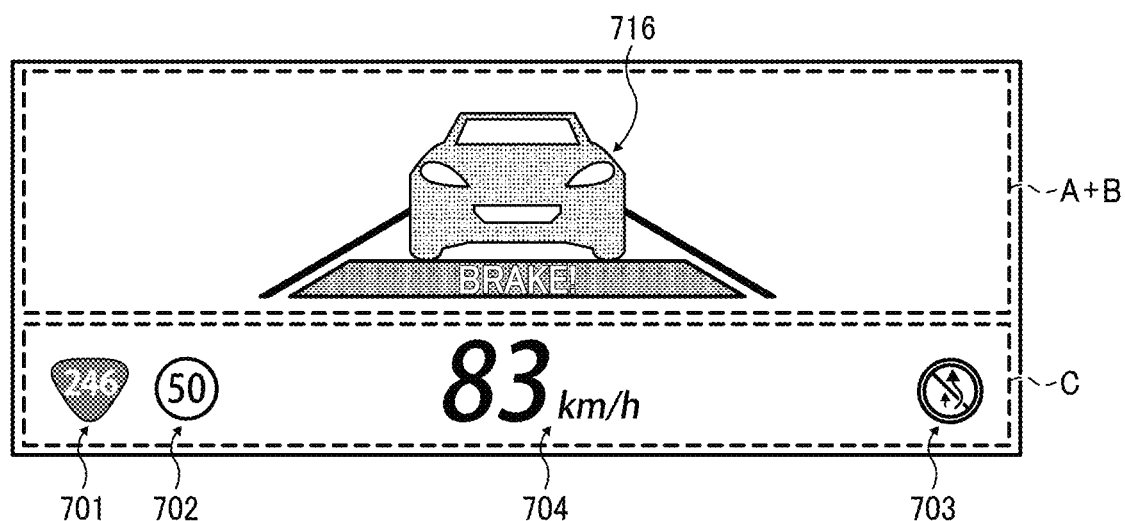

A method of making the driver 300 realize that following distance to the preceding vehicle 350 is too short is not limited to the first example images described above, but may be example images as illustrated in FIG. 11A and FIG. 11B. In the following description, these example images illustrated in FIG. 11A and FIG. 11B are referred to as second example images.

In a similar manner to the first example images illustrated in FIGS. 10A to 10E, images indicating the preceding-vehicle approaching information change according to following distance to the preceding vehicle 350 in the second example images. More specifically, in place of the five horizontal lines of the following-distance presenting image 712 of the first example images described as above, a following-distance presenting image 715 consisting of a trapezoid image drawn towards the vanishing point using the perspective drawing method is used in the second example image of FIG. 11A, and the trapezoid image of the following-distance presenting image 715 is divided into four in the up-and-down directions. In a similar manner to the first example images described above where the vehicle bumper image 712a moves upward to get close to the preceding vehicle image 724 as the distance to the preceding vehicle 350 becomes shorter, in the second example image, a high-brightness trapezoidal section 715 moves upward to get close to the preceding vehicle image 724 as the distance to the preceding vehicle 350 becomes shorter. Note that the example image illustrated in FIG. 11A corresponds to the image illustrated in FIG. 10D, and indicates a case in which the preceding vehicle 350 is recognized and the following distance to the preceding vehicle 350 is shorter than the prescribed safe range but longer than a prescribed braking-required distance.

Moreover, when the following distance to the preceding vehicle 350 gets close to the range of the prescribed braking-required distance in the second example image, as illustrated in FIG. 11B, the image controller 250 displays a brake warning image 716 that is displayed across the upper display area A and the middle display area B. The brake warning image 716 is a combination of a red image obtained by magnifying the preceding vehicle image 724 to be displayed in the upper display area A and a red image of all the trapezoidal sections of the following-distance presenting image 715 according to the second example image illustrated in FIG. 11A. What is more, in the second example image illustrated in FIG. 11B, all the direction-change instruction images 721, 722, and 723 are hidden such that the brake warning image 716 stands out.

[Third Example Image]

Figure 12:
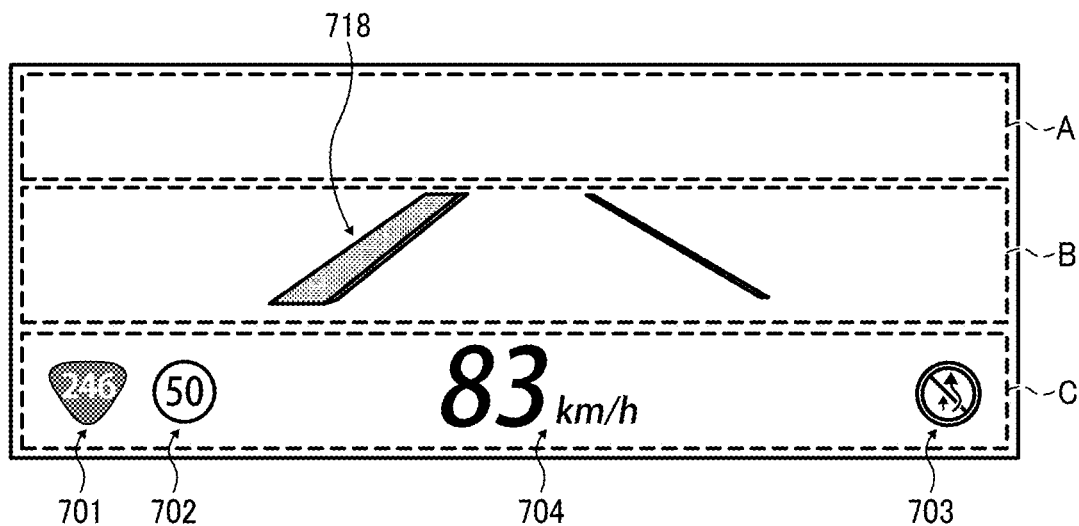
FIG. 12 is a schematic diagram of a third example image where a school-commuting-route warning image is displayed in the middle display area when the road on which the vehicle is traveling is a school commuting route, according to an embodiment of the present invention.

Alternatively, information whose provision is particularly desired by the driver 300 may be displayed in the middle display area B as a warning image. Such information is the information relating to the road on which the vehicle 301 is traveling, including the information relating to the road closed to vehicles or the information relating to the restricted or designated road. For example, as illustrated in the example image of FIG. 12, a school-commuting-route warning image 718 that indicates that the road on which the vehicle 301 is traveling is a school commuting route is displayed in the middle display area B. In the following description, the example image illustrated in FIG. 12 is referred to as third example image. More specifically, the image controller 250 obtains road-specific information of the road on which the vehicle 301 is traveling from the various kinds of data or the like output from the vehicle navigation device 400. Then, when the obtained road-specific information is the information to be displayed in the middle display area B, the image controller 250 displays in the middle display area B a warning image that corresponds to the obtained road-specific information.

As described above, the middle display area B is an area in which an instruction image indicating the instruction to be dealt with prior to the other multiple instructions is displayed. For this reason, when such a warning image is displayed in the middle display area B as in the third example image, the driver can recognize through intuition that the road on which the vehicle 301 is currently traveling may be closed, restricted, or designated as specified by the warning image.

[Fourth Example Image]

Figure 13:
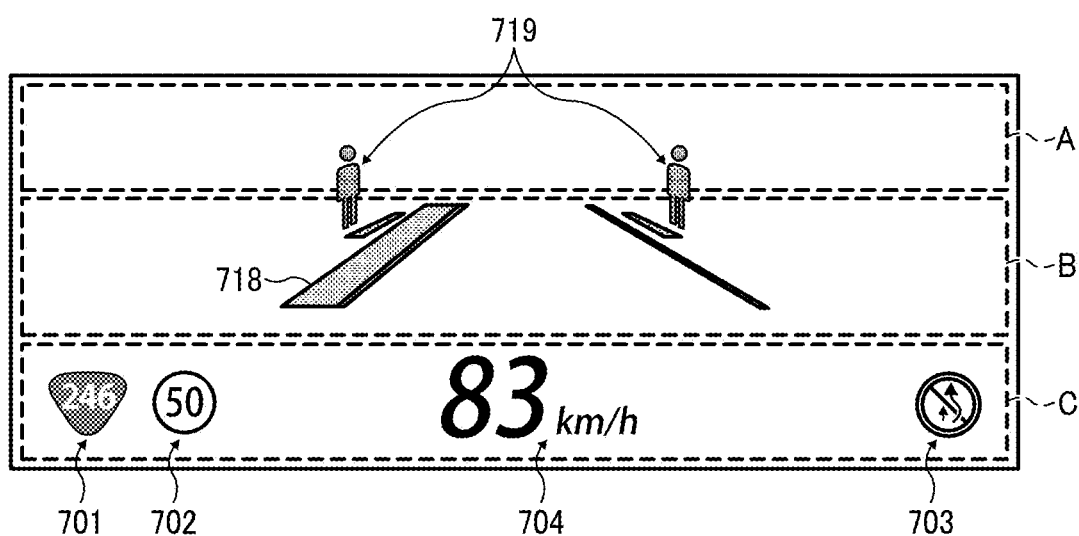
FIG. 13 is a schematic diagram of a fourth example image where a human-shaped warning image is displayed in the middle display area when a person who is about to cross a pedestrian crossing in the direction of travel of the vehicle is detected, according to an embodiment of the present invention.

When a person is detected who is about to cross a pedestrian crossing in the direction of travel of the vehicle 301, the warning image of such a detection may be displayed in the middle display area B. For example, a human-shaped warning image 719 is displayed in the middle display area B as in the example image illustrated in FIG. 13. In the following description, the example image illustrated in FIG. 13 is referred to as a fourth example image. More specifically, the image controller 250 uses the object recognition device 100 and the sensor device 500 to recognize a person ahead of the vehicle. Then, the image controller 250 receives the recognition-result data that indicates the distance to the person ahead of the vehicle, and displays the human-shaped warning image 719 in the middle display area B based on the received recognition-result data. Note also that the school-commuting-route warning image 718, which is described as above with reference to the third example image, is displayed together in the fourth example image.

The embodiments described above are given as an example, and advantageous effects are achieved for each of the following modes A to L.

<Mode A>

An information provision device such as the on-vehicle HUD 200 includes an image-light projection device such as the HUD 230 configured to project an image light to a light transmission member such as the front windshield 302 so as to display a for-driver information image indicating for-driver information to be provided to the driver 300 of a mobile object such as the vehicle 301 in a prescribed display area 700 that is visually recognized by the driver 300 through the light transmission member ahead of the mobile object in a direction of travel, and a display controller such as the image controller 250 configured to control, according to a prescribed priority for-driver information display condition such as a condition that the following distance to the following distance to the preceding vehicle 350 is shorter than a specified distance, the image-light projection device so as to display at a first point where a normal for-driver information image such as the path indicator image 721 is displayed a priority for-driver information image such as the preceding vehicle image 724 indicating priority for-driver information such as the preceding-vehicle approaching information that has higher priority in provision to the driver than normal for-driver information such as the route navigation information according to the normal for-driver information image in place of the normal for-driver information image, wherein the display controller controls the image-light projection device so as to display the normal for-driver information image at a second point different from the first point for at least some of a period during which the priority for-driver information image is displayed at the first point.

According to the present mode, even when a priority for-driver information image is displayed on a priority basis at a point where a normal for-driver information image is displayed, the driver can receive the normal for-driver information via the normal for-driver information image.

<Mode B>

In the Mode A, the display controller controls the image-light projection device so as to display the normal for-driver information image in a proximity of the priority for-driver information image for at least some of a period during which the priority for-driver information image is displayed at the first point.

According to the present mode, the position at which a normal for-driver information image is displayed while a priority for-driver information image is being displayed is in the proximity of the position at which the normal for-driver information image is displayed while the priority for-driver information image is being hidden. Accordingly, the driver can easily find the normal for-driver information image, and the driver does not get confused.

<Mode C>

In the mode A or the mode B, the normal for-driver information image is an instruction image such as the direction-change instruction images 721, 722, and 723 indicating an instruction to the driver of the mobile object. If the instruction image that indicates an instruction to the driver is hidden or becomes difficult to find as the priority for-driver information image is displayed, the driver gets easily confused.

According to the present mode, the instruction image is displayed at an easily detectable position even while the priority for-driver information image is being displayed. Accordingly, a factor that may confuse the driver can effectively removed.

<Mode D>

In the Mode C, the instruction image is a route navigation image such as the direction-change instruction images 721, 722, and 723 indicating route navigation information providing a route to a prescribed destination to the driver.

According to the present mode, a situation in which is the driver gets confused as the route navigation image is hidden or becomes difficult to find while the priority for-driver information image is being displayed can be avoided.

<Mode E>

In any one the modes A to D, the priority for-driver information image includes an urgent instruction image such as the preceding vehicle image 724 indicating an instruction for urgent action such as the preceding-vehicle approaching information to the driver.

According to the present mode, when an instruction for urgent action is to be provided to the driver, a situation in which the driver gets confused as the normal for-driver information image is hidden or becomes difficult to find can be avoided.

<Mode F>

In the mode E, the urgent instruction image includes a plurality of urgent instruction images with varying degree of urgency of the urgent action, the plurality of urgent instruction images include a less-urgent instruction image such as the preceding vehicle image 724 as illustrated in FIG. 10B, FIG. 10C, and FIG. 10D with a lower degree of urgency, and a highly-urgent instruction image such as the preceding vehicle image 724' and the brake warning image 714 as illustrated in FIG. 10E with a greater degree of urgency than the less-urgent instruction image, and the display controller controls the image-light projection device to display the normal for-driver information image in a proximity of the less-urgent instruction image when the less-urgent instruction image is to be displayed at the first point, and to hide the normal for-driver information image when the highly-urgent instruction image is to be displayed at the first point.

According to the present mode, the normal for-driver information image is hidden when the highly-urgent instruction image is displayed. Accordingly, the visual recognizability of the highly-urgent instruction image by the driver improves, and the instruction for urgent action can be provided to the driver in a prompt and accurate manner.

<Mode G>

In the mode F, the highly-urgent instruction image is larger than the less-urgent instruction image in dimension.

According to the present mode, as illustrated in the second example image, the highly-urgent instruction image such as the brake warning image 716 is larger than the less-urgent instruction image such as the preceding vehicle image 724 in dimension.

Accordingly, the visual recognizability of the highly-urgent instruction image by the driver improves, and the instruction for urgent action can be provided to the driver in a prompt and accurate manner.

<Mode H>

In the mode F or mode G, the highly-urgent instruction image has a greater brightness than the less-urgent instruction image.

According to the present mode, as illustrated in the second example image, the highly-urgent instruction image such as the brake warning image 716 has a greater brightness than the less-urgent instruction image such as the preceding vehicle image 724. Accordingly, the visual recognizability of the highly-urgent instruction image by the driver improves, and the instruction for urgent action can be provided to the driver in a prompt and accurate manner.

<Mode I>

In any one the modes A to H, the image-light projection device projects the image light to display the normal for-driver information image and the priority for-driver information image as a virtual image G in the prescribed display area, and the distance between the driver and the virtual image is equal to or longer than 5 m.

As described above, the driver usually drives while focusing on an object in the distance. When the distance between the driver and the virtual image G is equal to or longer than 5 m, the amount of movement in the crystalline lenses of the eyes is reduced to a less amount of movement than the background art where a normal distance between the driver and the virtual image G is about 2 m. As a result, the time required to adjust the focus of the eyes and focus on the virtual image G becomes shorter. Accordingly, the driver can recognize information provided via the normal for-driver information image or the priority for-driver information image displayed on the
virtual image G at an early stage, and the possible tiredness of the eyes of the driver can be reduced.

<Mode J>

In any one the modes A to I, the image-light projection device includes a light emitter configured to emit the image light, and an optical scanner configured to scan the image light emitted from the light emitter two-dimensionally, and the image-light projection device projects the image light two-dimensionally scanned by the optical scanner to the light transmission member to display the normal for-driver information image and the priority for-driver information image in the prescribed display area.

As described above, according to the present mode, it is easier to display a virtual image G with a wide dimension and high brightness than the systems with, for example, the LCD and the VFD. Moreover, according to the present mode, the light that irradiates the non-image area of the display area on which the virtual image G is displayed can be completely shut by preventing the light emitter from emitting an image light. For this reason, if a laser scanning system is adopted as in the Mode H, the non-image area does not disturb the visual recognizability of the sight ahead of the mobile object as the light emitter that may irradiate the non-image area can be completely shut.

<Mode K>

A method of providing information includes projecting an image light to a light transmission member so as to display a for-driver information image indicating for-driver information to be provided to the driver of a mobile object in a prescribed display area that is visually recognized by the driver through the light transmission member ahead of the mobile object in a direction of travel, thereby providing the for-driver information to the driver, and displaying, according to a prescribed priority for-driver information display condition, at a first point where a normal for-driver information image is displayed a priority for-driver information image indicating priority for-driver information that has higher priority in provision to the driver than normal for-driver information according to the normal for-driver information image in place of the normal for-driver information image, wherein the displaying includes displaying the normal for-driver information image at a second point different from the first point for at least some of a period during which the priority for-driver information image is displayed at the first point.

According to the present mode, even when a priority for-driver information image is displayed on a priority basis at a point where a normal for-driver information image is displayed, the driver can receive the normal for-driver information via the normal for-driver information image.

<Mode L>

A computer-readable non-transitory recording medium stores a program for causing a computer of an information provision device to execute an information-provision control method. The information provision device includes an image-light projection device configured to project an image light to a light transmission member so as to display a for-driver information image indicating for-driver information to be provided to the driver of a mobile object in a prescribed display area that is visually recognized by the driver through the light transmission member ahead of the mobile object in a direction of travel, and a display controller configured to control, according to a prescribed priority for-driver information display condition, the image-light projection device so as to display at a first point where a normal for-driver information image is displayed a priority for-driver information image indicating priority for-driver information that has higher priority in provision to the driver than normal for-driver information according to the normal for-driver information image in place of the normal for-driver information image. The display controller controls the image-light projection device so as to display the normal for-driver information image at a second point different from the first point for at least some of a period during which the priority for-driver information image is displayed at the first point.

According to the present mode, even when a priority for-driver information image is displayed on a priority basis at a point where a normal for-driver information image is displayed, the driver can receive the normal for-driver information via the normal for-driver information image.

Note that the program mentioned above may be distributed or made available in a state being recorded on recording medium such as a compact disc read only memory (CD-ROM). Alternatively, the programs may be distributed or made available by distributing or receiving the signal, which carries the program and is transmitted from a certain transmitter, through a transmission medium such as public telephone lines, a private line, and other sorts of network. In such distribution, the transmission medium may carry only a part of the computer program. In other words, it is not necessary for all the data that makes up the computer program to exist in a transmission medium at one time. The above-mentioned signal that carries a program is a computer data signal that is implemented in a prescribed carrier including a computer program. A method of transmitting a computer program from a certain transmitter includes cases in which the data that makes up the program is continuously transmitted and cases in which the data that makes up the program is intermittently transmitted.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory cards, ROM, etc. Alternatively, any one of the above-described and other methods of the present invention may be implemented by ASICs, prepared by interconnecting an appropriate network of conventional component circuits, or by a combination thereof with one or more conventional general-purpose microprocessors and/or signal processors programmed accordingly.

What is claimed is:

1. An image display apparatus, comprising:
    a display to display current speed information of a mobile object in a first horizontal region in such a manner that the current speed information is visible to a driver via a light transmission member through which the driver is able to visually check outside of the mobile object; and
    processing circuitry configured to control the display to display, only in the first horizontal region, road-specific information, including road-identifying information identifying a current road on which the mobile object is travelling, and a current speed limit for the road, together with the current speed information,
    wherein the processing circuitry is further configured to control the display to display first passive information in a second horizontal region immediately above the displayed current speed information displayed in the first horizontal region, wherein the first passive information includes following distance information and is other than a location on a route or a route map, and other than a route map or route map information, and is used by the driver to drive the mobile object, wherein the processing circuitry is further configured to display the following-distance information only in the second horizontal region, between the first horizontal region and a third horizontal region, and
    wherein the processing circuitry is further configured to control the display to display second passive information on an upper side of the second horizontal region in the third horizontal region immediately above the second horizontal region, the second passive information including an item of information that is to be used by the driver later than the first passive information to drive the mobile object displayed in the second horizontal region.

2. The image display apparatus according to claim 1, wherein the processing circuitry is further configured to control the display to display the first passive information, which is security information for driving.

3. The image display apparatus according to claim 1, wherein the processing circuitry is further configured to control the display to display security information for driving, including an alert about braking.

4. The image display apparatus according to claim 1, further comprising:
    a projector configured to project the current speed information and the first and second passive information to the light transmission member,
    wherein the current speed information and the first and second passive information are visually recognized by the driver as if the current speed information and the first and second passive information are displayed ahead of the light transmission member.

5. The image display apparatus according to claim 1, wherein the processing circuitry is further configured to present the first passive information to the driver at a prescribed timing.

6. The image display apparatus of claim 1, wherein the processing circuitry is further configured to control the display to always display the first passive information immediately above the first horizontal region in which the current speed information is displayed such that no information is displayed between the current speed information and the first passive information in a vertical direction of the display.

7. A mobile object, comprising:
    a light transmission member through which a driver is able to visually check outside of the mobile object;
    a display configured to display current speed information of the mobile object in a first horizontal region in such a manner that the current speed information is visible to the driver via the light transmission member; and
    processing circuitry configured to control the display to display, only in the first horizontal region, road-specific information, including road-identifying information identifying a current road on which the mobile object is travelling, and a current speed limit for the road, together with the current speed information,
    wherein the processing circuitry is further configured to control the display to display first passive information in a second horizontal region immediately above the displayed current speed information displayed in the first horizontal region, wherein the first passive information includes following distance information and is other than a location on a route or a route map, and other than a route map or route map information, and is used by the driver to drive the mobile object, wherein the processing circuitry is further configured to display the following-distance information only in the second horizontal region, between the first horizontal region and a third horizontal region, and
    wherein the processing circuitry is further configured to control the display to display second passive information on an upper side of the second horizontal region in a third horizontal region immediately above the second horizontal region, the second passive information including an item of information that is to be used by the driver later than the first passive information to drive the mobile object displayed in the second horizontal region.

8. A computer-readable non-transitory recording medium storing a program for causing a computer to execute a method, the method comprising:
    displaying current speed information of a mobile object in a first horizontal region in such a manner that the current speed information is visible to a driver via a light transmission member through which the driver is able to visually check outside of the mobile object;

displaying, only in the first horizontal region, road-specific information, including road-identifying information identifying a current road on which the mobile object is travelling, and a current speed limit for the road, together with the current speed information;

displaying first passive information in a second horizontal region immediately above the displayed current speed information displayed in the first horizontal region, wherein the first passive information includes following distance information and is other than a location on a route or a route map, and other than a route map or route map information, and is to be used by the driver to drive the mobile object, the method further comprising displaying the following-distance information only in the second horizontal region, between the first horizontal region and a third horizontal region, and displaying second passive information on an upper side of the second horizontal region in the third horizontal region immediately above the second horizontal region, the second passive information including an item of information that is to be used by the driver later than the first passive information to drive the mobile object displayed in the second horizontal region.

9. A method of displaying an image, the method comprising:

displaying current speed information of a mobile object in a first horizontal region in such a manner that the current speed information becomes visible to a driver through a light transmission member through which the driver is able to visually check outside of the mobile object;

displaying, only in the first horizontal region, road-specific information, including road-identifying information identifying a current road on which the mobile object is travelling, and a current speed limit for the road, together with the current speed information;

displaying first passive information on an upper side of the speed information in a second horizontal region immediately above the displayed current speed information displayed in the first horizontal region, wherein the first passive information includes following distance information and is other than a location on a route or a route map and other than a route map or route map information, and is used by the driver to drive the mobile object, wherein the method further comprises displaying the following-distance information only in the second horizontal region, between the first horizontal region and third horizontal region, and displaying second passive information on an upper side of the second horizontal region in the third horizontal region immediately above the second horizontal region, the second passive information including an item of information that is to be used by the driver later than the first passive information to drive the mobile object displayed in the second horizontal region.

* * * * *